US012562791B2

(12) United States Patent
Woo et al.

(10) Patent No.: US 12,562,791 B2
(45) Date of Patent: Feb. 24, 2026

(54) ELECTRONIC DEVICE FOR OPERATING ANTENNA MODULE AND METHOD FOR CONTROLLING SAME

(71) Applicant: SAMSUNG ELECTRONICS CO., LTD., Suwon-si (KR)

(72) Inventors: Junyoung Woo, Suwon-si (KR); Junsuk Kim, Suwon-si (KR); Minho Yang, Suwon-si (KR); Hyoungjoo Lee, Suwon-si (KR); Euichang Jung, Suwon-si (KR); Chaeman Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 381 days.

(21) Appl. No.: 18/120,072

(22) Filed: Mar. 10, 2023

(65) Prior Publication Data

US 2023/0216557 A1 Jul. 6, 2023

Related U.S. Application Data

(63) Continuation of application No. PCT/KR2021/011547, filed on Aug. 27, 2021.

(30) Foreign Application Priority Data

Sep. 11, 2020 (KR) ........................ 10-2020-0117105

(51) Int. Cl.
*H04B 7/06* (2006.01)
*H04B 1/00* (2006.01)
(Continued)

(52) U.S. Cl.
CPC ......... *H04B 7/0604* (2013.01); *H04B 1/0064* (2013.01); *H04B 1/38* (2013.01); *H04B 17/18* (2015.01)

(58) Field of Classification Search
CPC ...... H04B 7/0604; H04B 1/0064; H04B 1/38; H04B 17/18; H04B 1/00; H04B 1/50; (Continued)

(56) References Cited

U.S. PATENT DOCUMENTS 8,270,925 B2 * 9/2012 Behzad ................... H04B 1/50
10,027,287 B1 7/2018 Ichitsubo et al.
(Continued)

FOREIGN PATENT DOCUMENTS

KR 10-2019-0043768 4/2019
KR 10-2019-0096142 8/2019
(Continued)

OTHER PUBLICATIONS

Korean Office Action issued Sep. 2, 2024 in corresponding Korean Patent Application No. 10-2020-0117105.
(Continued)

*Primary Examiner* — Lana N Le
(74) *Attorney, Agent, or Firm* — NIXON & VANDERHYE P.C.

(57) ABSTRACT

The present disclosure relates to a device for activating a radio frequency (RF) module which is to be used efficiently in an electronic device that operates a plurality of RF modules (or antenna modules) in a wireless communication system, and to a method for controlling same. To this end, the electronic device checks the temperatures of the plurality of antenna modules using a first frequency band, and identifies candidate antenna modules in consideration of the temperatures of the plurality of antenna modules. The electronic device selects a serving antenna module from among the candidate antenna modules so that an available temperature state, in which the temperatures of the candidate antenna modules are lower than a threshold temperature, is maintained, and transmits and receives a signal using the (Continued)

first frequency band in the serving antenna module. The candidate antenna modules may include antenna modules which support communication performance of a threshold level or higher.

18 Claims, 25 Drawing Sheets

(51) Int. Cl.
      *H04B 1/38*          (2015.01)
      *H04B 17/18*         (2015.01)
(58) Field of Classification Search
      CPC .. H04B 7/0608; H04B 7/0691; H04B 17/318;
                    H04B 7/06956; H04B 7/0802; H04B
                    7/0404; H04B 7/0834; H04B 1/1027;
                    H04W 52/245; H04W 52/24
      See application file for complete search history.

(56)                   References Cited

U.S. PATENT DOCUMENTS

| | | | |
|---|---|---|---|
| 10,135,484 B2 | 11/2018 | Jain et al. | |
| 10,326,513 B2 | 6/2019 | Mobasher et al. | |
| 10,593,183 B2 | 3/2020 | Funaki et al. | |
| 10,644,762 B2 | 5/2020 | Seol et al. | |
| 2011/0116490 A1* | 5/2011 | Wilhelmsson | H04W 16/14 |
| | | | 370/343 |
| 2012/0302283 A1* | 11/2012 | Sun | H04B 1/38 |
| 2013/0039173 A1 | 2/2013 | Ehsan et al. | |

| | | | |
|---|---|---|---|
| 2018/0041906 A1* | 2/2018 | Jang | H04W 16/14 |
| 2018/0278309 A1 | 9/2018 | Raghavan et al. | |
| 2019/0123787 A1 | 4/2019 | Seol et al. | |
| 2019/0132851 A1 | 5/2019 | Davydov et al. | |
| 2020/0220572 A1 | 7/2020 | Kwon et al. | |
| 2020/0236618 A1 | 7/2020 | Yu et al. | |
| 2020/0365987 A1 | 11/2020 | Kim et al. | |
| 2022/0150895 A1* | 5/2022 | Schober | H04W 72/23 |
| 2022/0322339 A1 | 10/2022 | Park et al. | |
| 2022/0393753 A1* | 12/2022 | Nakayama | H04B 7/0617 |
| 2022/0407574 A1* | 12/2022 | Goto | H04B 7/0691 |
| 2023/0111603 A1* | 4/2023 | Ghimire | H04B 7/0421 |
| | | | 455/456.1 |
| 2023/0126162 A1* | 4/2023 | Yang | H04B 1/005 |

FOREIGN PATENT DOCUMENTS

| | | |
|---|---|---|
| KR | 10-2020-0044569 | 4/2020 |
| KR | 10-2020-0050852 | 5/2020 |
| KR | 10-2020-0086067 | 7/2020 |
| KR | 10-2020-0090081 | 7/2020 |
| WO | 2019/045865 | 3/2019 |

OTHER PUBLICATIONS

Notice of Patent Grant dated May 22, 2025 issued in Korean Patent Application No. 10-2020-0117105.
International Search Report for PCT/KR2021/011547 mailed Dec. 21, 2021, 5 pages.
Written Opinion of the ISA for PCT/KR2021/011547 mailed Dec. 21, 2021, 4 pages.

* cited by examiner

1000

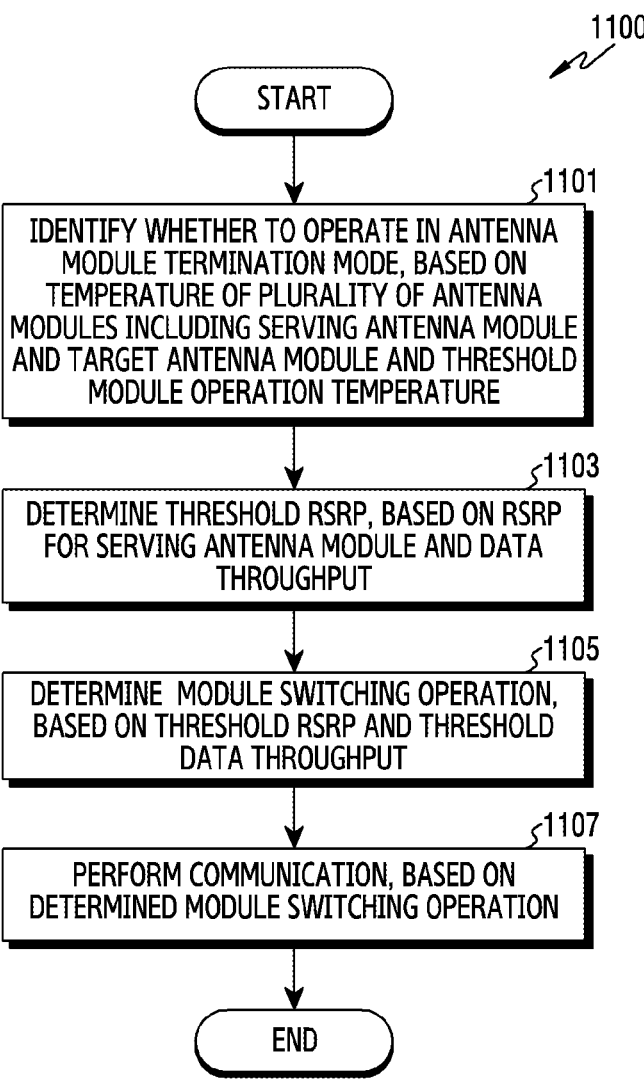

1100

START

1101

IDENTIFY WHETHER TO OPERATE IN ANTENNA
MODULE TERMINATION MODE, BASED ON
TEMPERATURE OF PLURALITY OF ANTENNA
MODULES INCLUDING SERVING ANTENNA MODULE
AND TARGET ANTENNA MODULE AND THRESHOLD
MODULE OPERATION TEMPERATURE

1103

DETERMINE THRESHOLD RSRP, BASED ON RSRP
FOR SERVING ANTENNA MODULE AND DATA
THROUGHPUT

1105

DETERMINE  MODULE SWITCHING OPERATION,
BASED ON THRESHOLD RSRP AND THRESHOLD
DATA THROUGHPUT

1107

PERFORM COMMUNICATION, BASED ON
DETERMINED MODULE SWITCHING OPERATION

END

2000
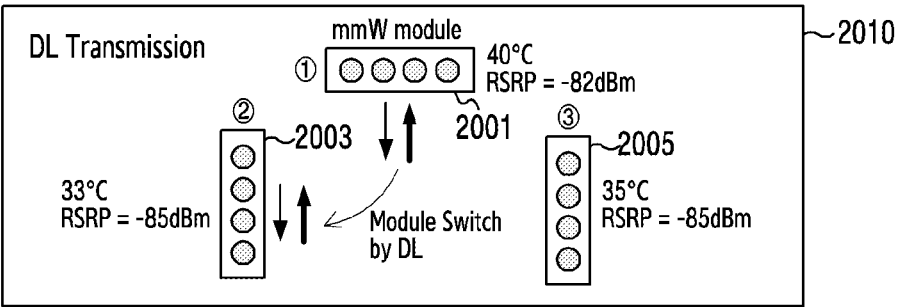
DL Transmission
mmW module
① 40°C RSRP = -82dBm
2001
② 2003
33°C RSRP = -85dBm
Module Switch by DL
③ 2005
35°C RSRP = -85dBm
~2010
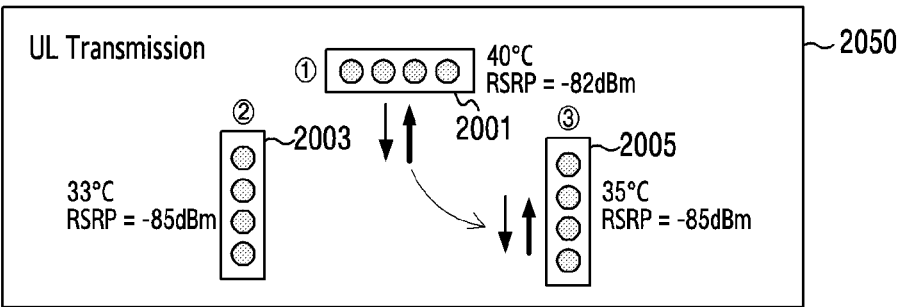
UL Transmission
① 40°C RSRP = -82dBm
2001
② 2003
33°C RSRP = -85dBm
③ 2005
35°C RSRP = -85dBm
~2050
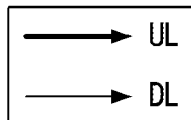
UL
DL
FIG.20

2200
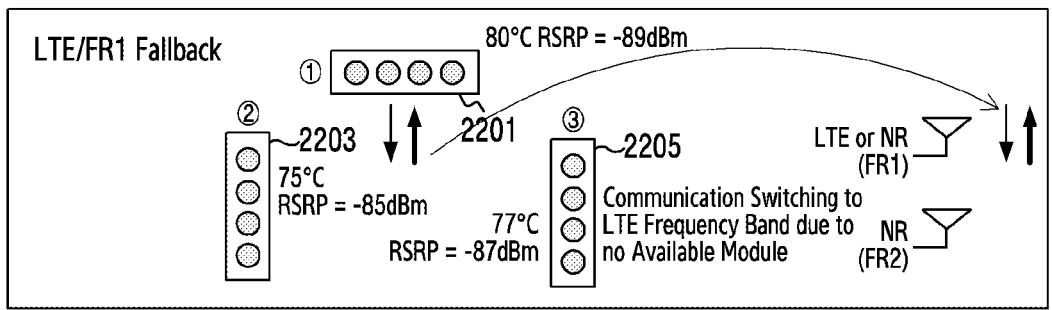
LTE/FR1 Fallback
80°C RSRP = -89dBm
① 2201
② 2203
75°C
RSRP = -85dBm
③ 2205
77°C
RSRP = -87dBm
Communication Switching to
LTE Frequency Band due to
no Available Module
LTE or NR
(FR1)
NR
(FR2)
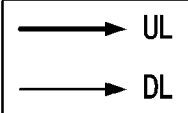
→ UL
→ DL
FIG.22

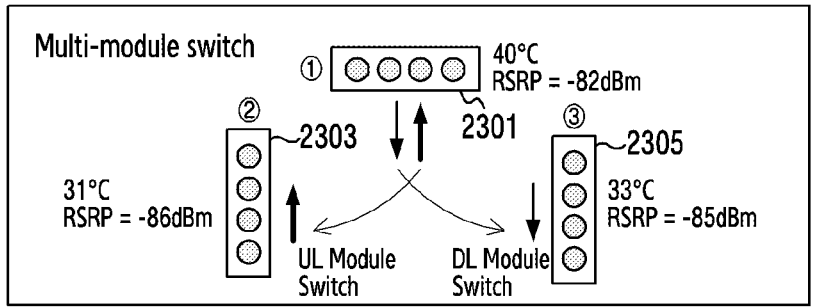
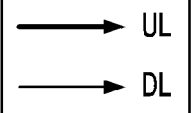
FIG.23

ELECTRONIC DEVICE FOR OPERATING ANTENNA MODULE AND METHOD FOR CONTROLLING SAME

CROSS-REFERENCE TO RELATED APPLICATIONS

This application is a continuation of International Application No. PCT/KR2021/011547 designating the United States, filed on Aug. 27, 2021, in the Korean Intellectual Property Receiving Office and claiming priority to Korean Patent Application No. 10-2020-0117105, filed on Sep. 11, 2020, in the Korean Intellectual Property Office, the disclosures of which are incorporated by reference herein in their entireties.

BACKGROUND

Field

The disclosure relates to an electronic device for managing the use of an antenna module in a wireless communication system and a method of controlling the same.

Description of Related Art

To meet the demand for wireless data traffic having increased since deployment of 4th generation (4G) communication systems, a 5th generation (5G) or pre-5G communication system (hereinafter, collectively referred to as "a 5G communication system") has been introduced. The 5G or pre-5G communication system is also called a "beyond 4G network" communication system or a "post LTE" system.

The 5G communication system may use high frequency (e.g., mmWave) bands (e.g., 3 GHz to 100 GHz) having strong rectilinearity so as to accomplish higher transfer rates (or higher data rates).

Compared to communication systems (e.g., 4G communication systems) using relatively lower frequency bands (less than 6 GHz), the 5G communication system can have high attenuation properties (e.g., an attenuation of 20 to 30 dB) in a free-space.

Therefore, beamforming, massive multiple-input multiple-output (massive MIMO), full dimensional MIMO (FD-MIMO), array antenna, analog beam forming, and large scale antenna techniques may be employed in the 5G communication system.

A $5^{th}$ generation (5G) communication system or a pre-5G communication system (hereinafter, used as a '5G communication system') has been introduced to meet increasing traffic demands after commercialization of a $4^{th}$ generation (4G) communication system. The 5G communication system is called a beyond-4G-network communication system or a post-long-term evolution (LTE) system.

The 5G communication system may use a high-frequency (mmWave) band (for example, 3 GHz to 100 GHz) having strong straightness in order to achieve a higher transmission rate (or a higher data transmission rate) than the 4G communication system. The 5G communication system may apply a front end structure in which a transceiver and antenna is integrated into one module to support a high-frequency band.

The 5G communication system may have a high attenuation characteristic (for example, about 20 to 30 dB attenuation) in a free space compared to a communication system (for example, the 4G communication system) using a relatively low frequency band (lower than 6 GHz).

Accordingly, technologies such as beamforming, massive MIMO, full dimensional MIMO (FD-MIMO), array antenna, analog beam-forming, and large scale antenna may be applied to the 5G communication system.

SUMMARY

A method of operating an electronic device according to an example embodiment of the disclosure includes: identifying temperatures of a plurality of antenna modules using a first frequency band, identifying candidate antenna modules in consideration of the plurality of antenna modules, selecting a serving antenna module from among the candidate antenna modules to maintain an available temperature state in which temperatures of the candidate antenna modules are lower than a threshold temperature, and transmitting and receiving a signal in the first frequency band through the serving antenna module, wherein the candidate antenna modules comprise antenna modules supporting communication performance higher than a threshold level.

An electronic device according to an example embodiment of the disclosure includes: a plurality of first antenna modules including at least one first antenna configured to use a first frequency band, at least one second antenna module including at least one second antenna configured to use a second frequency band different from the first frequency band, and at least one processor electrically coupled to the plurality of first antenna modules and the at least one second antenna module and configured to: control a transmission operation and a reception operation of signals through the plurality of first antenna modules and the at least one second antenna module, wherein the at least one processor is configured to: identify temperatures of the plurality of first antenna modules, identify candidate antenna modules including at least one antenna in consideration of the plurality of first antenna modules, select a serving antenna module from among the candidate antenna modules to maintain an available temperature state in which temperatures of the candidate antenna modules are lower than a threshold temperature, and control the serving antenna module to transmit and receive a signal in the first frequency band, wherein the candidate antenna modules comprise antenna modules configured to support communication performance higher than a threshold level.

Further, one or more selected features of any embodiment described in the disclosure may be combined with one or more selected features of any other embodiment described in the disclosure.

In any example implementation described in the disclosure, two or more physically separate components may be alternatively integrated into a single component if the integration is possible, and the integration is possible if the same function is performed by the configured single component. On the other hand, a single component of any example implementation described in the disclosure may be alternatively realized as two or more separate components achieving the same function where appropriate.

Certain embodiments of the disclosure may at least partially resolve, alleviate, or remove at least one of the problems and/or disadvantages related to the related arts.

According to various example embodiments of the disclosure, an electronic device operating a plurality of RF modules may alternately use the RF modules before temperature of an RF module being currently used increases, thereby increasing a maintenance time without any performance deterioration of the RF module.

Advantageous effects obtainable from the disclosure may not be limited to the above mentioned effects, and other effects which are not mentioned may be clearly understood, through the following descriptions, by those skilled in the art to which the disclosure pertains.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 11 is a flowchart illustrating an example method of operating a UE in a wireless communication system according to various embodiments;

FIG. 20 is a diagram illustrating an example of a module switching mode in a wireless communication system according to various embodiments;

FIG. 22 is a diagram illustrating an example of a module termination mode in a wireless communication system according to various embodiments;

FIG. 23 is a diagram illustrating an example of multi-module switching in a wireless communication system according to various embodiments.

DETAILED DESCRIPTION

The terms used in the disclosure are used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even a term defined in the disclosure should not be interpreted to exclude embodiments of the disclosure.

Hereinafter, various example embodiments of the disclosure will be described based on an approach of hardware. However, various embodiments of the disclosure include a technology that uses both hardware and software, and thus the various embodiments of the disclosure may not exclude the perspective of software.

The disclosure relates to an apparatus and a method for distributively managing RF modules in a wireless communication system. For example, the disclosure describes a technology for distributively using RF modules in consideration of temperature and performance of RF modules in a wireless communication system.

In the following description, terms referring to signals, referring to channels, terms referring to control information, terms referring to network entities, terms referring to device elements, and the like are illustratively used for the sake of convenience. Therefore, the disclosure is not limited by the terms as used below, and other terms referring to subjects having equivalent technical meanings may be used.

As used in the disclosure, the expression "greater than" or "less than" is used to determine whether a specific condition is satisfied or fulfilled, but this is intended only to illustrate an example and does not exclude "greater than or equal to" or "equal to or less than". A condition indicated by the expression "greater than or equal to" may be replaced with a condition indicated by "greater than", a condition indicated by the expression "equal to or less than" may be replaced with a condition indicated by "less than", and a condition indicated by "greater than and equal to or less than" may be replaced with a condition indicated by "greater than and less than".

In the disclosure, various embodiments will be described using terms employed in some communication standards (e.g., the 3rd generation partnership project (3GPP)), but they are only for the sake of illustration. The embodiments of the disclosure may also be easily applied to other communication systems through modifications.

Figure 1:
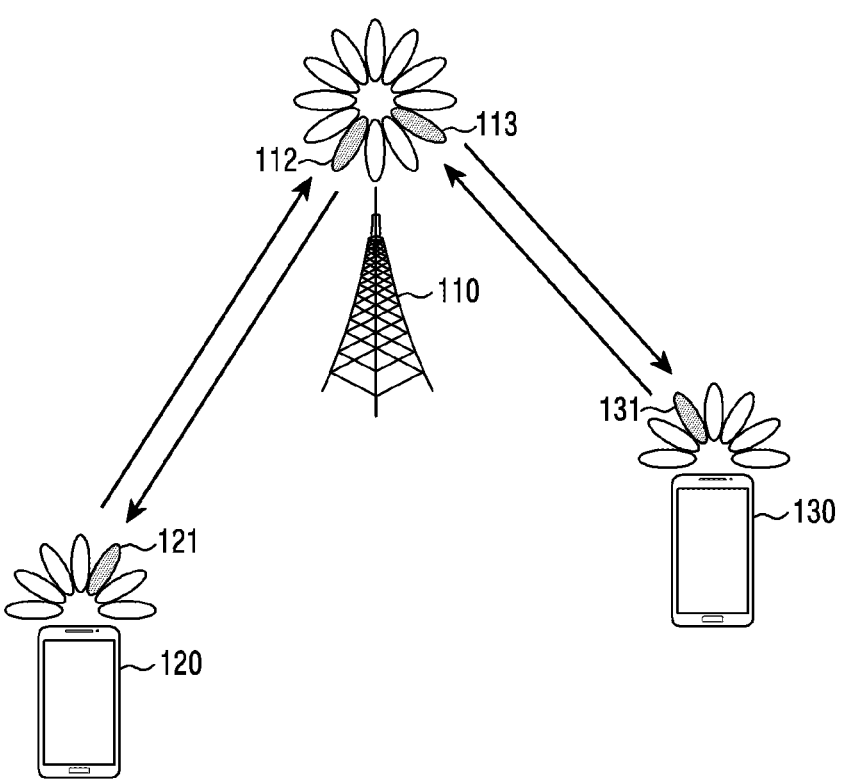
FIG. 1 is a diagram illustrating an example structure of a wireless communication system according to various embodiments.

FIG. 1 is a diagram illustrating an example structure of a wireless communication system according to various embodiments.

Referring to FIG. 1, it is assumed that a base station (BS) 110 performs wireless communication with two UEs 120 and 130 in a wireless communication system according to an embodiment. For example, the BS 110, the first UE 120, and the second UE 130 are illustrated as parts of nodes using a radio channel in the wireless communication system. FIG. 1 illustrates only one BS 110, but other BSs which are the same as or similar to the BS 110 may be further included.

According to an embodiment, the BS 110 may be a network infrastructure element that provides radio access to the UEs 120 and 130. The BS 110 may have coverage defined as a predetermined geographical area on the basis of the distance to which a signal can be transmitted. The BS 110 may be referred to as an "access point (AP)", an "eNodeB (eNB)", a "5th-generation (5G) node", a "gNodeB (next generation node B (gNB))", a "wireless point", or a "transmission/reception point (TRP)", or using another term having a technical meaning equivalent thereto.

According to an embodiment, the first UE 120 and the second UE 130 are devices used by users and may communicate with the BS 110 through a radio channel. At least one of the UE 120 and the second UE 130 may be operate without involvement of the user. For example, at least one of the UE 120 and the second UE 130 may be a device performing machine type communication (MTC). The first UE 120 and the second UE 130 may be referred to as, for example, a 'user equipment (UE)', 'mobile station', 'subscriber station', 'remote terminal', 'wireless terminal', or 'user device', or using another term having an equivalent technical meaning. For example, at least some of the first UE 120 and the second UE 130 may be the same as an electronic device 501 of FIG. 5 or an electronic device 601 of FIG. 6.

According to an embodiment, the BS 110, the first UE 120, and the second UE 130 may transmit and receive a wireless signal in high-frequency bands (for example, 28 GHz, 30 GHz, 38 GHz, and 60 GHz). The BS 110, the first UE 120, and the second UE 130 may perform beamforming in order to improve a channel gain. The beamforming may include transmission and reception beamforming. The BS 110, the first UE 120, and the second UE 130 may assign directivity to a transmission signal or a reception signal. To this end, the BS 110 and the UEs 120 and 130 may select serving beams 112, 113, 121, and 131 through a beam search procedure or a beam management procedure. After selecting the serving beams 112, 113, 121, and 131, the BS 110 and the UEs 120 and 130 may perform communication through resources having a quasi-co-located (QCL) relationship with resources for the serving beams 112, 113, 121, and 131.

Large-scale characteristics of a channel for transmitting symbols on a first antenna port may be inferred from a channel for transmitting symbols on a second antenna port. In this case, the first antenna port may be evaluated as having the QCL relationship with the second antenna port. For example, the large-scale characteristics may include at least one of delay spread, Doppler spread, Doppler shift, average gain, average delay, and spatial receiver parameters.

Figure 2:
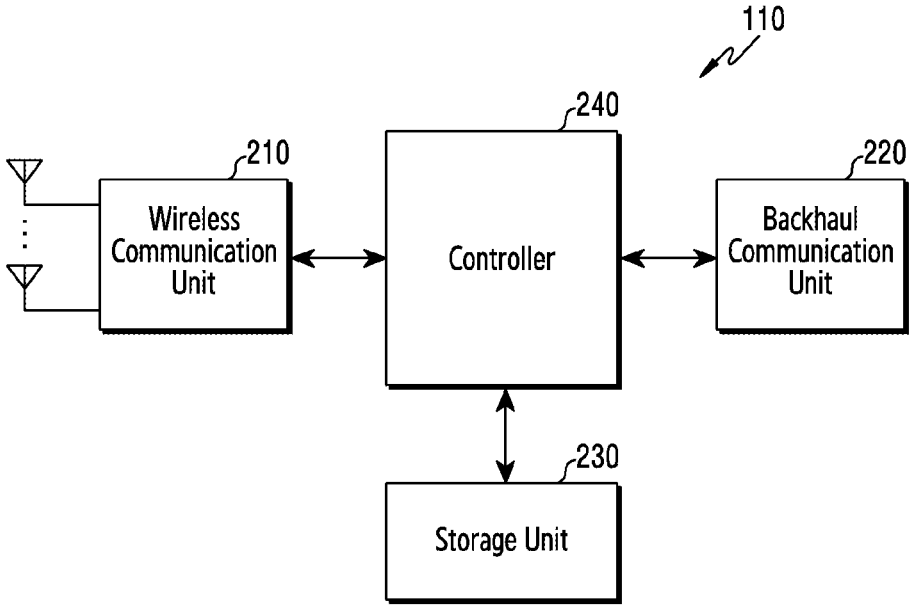
FIG. 2 is a block diagram illustrating an example configuration of a base station in a wireless communication system according to various embodiments.

FIG. 2 is a block diagram illustrating an example configuration of a base station in a wireless communication system according to various embodiments; The suffix "-unit" or "-er" used hereinafter may refer to a unit for processing at least one function or operation, and may be implemented as hardware, software, or a combination of hardware and software.

Referring to FIG. 2, a BS (for example, the BS 110 of FIG. 1 or the electronic device 504 of FIG. 5) according to an embodiment may include a wireless communication unit (e.g., including wireless communication circuitry) 210, a backhaul communication unit (e.g., including circuitry) 220, a storage unit (e.g., including a memory) 230, and a controller (e.g., including processing/control circuitry) 240.

According to an embodiment, the wireless communication unit 210 may include various wireless communication circuitry and perform functions for transmitting and receiving signals through a radio channel. The wireless communication unit 210 may perform, for example, a function for conversion between a baseband signal and a bitstream according to a physical layer standard of the system. For example, the wireless communication unit 210 may generate complex symbols by encoding and modulating a transmission bitstream in data transmission, and may reconstruct a reception bitstream by demodulating and decoding the baseband signal in data reception.

The wireless communication unit 210 may up-convert the baseband signal into an RF signal, transmit the RF signal through an antenna, and down-convert the RF signal received through the antenna into a baseband signal. To this end, the wireless communication unit 210 may include, for example, at least one of a transmission filter, a reception filter, an amplifier, a mixer, an oscillator, a digital-to-analog convertor (DAC), and an analog-to-digital convertor (ADC). The wireless communication unit 210 may include a plurality of transmission and reception paths. In addition, wireless communication unit 210 may further include at least one antenna array including a plurality of antenna elements.

On the hardware side, the wireless communication unit 210 may include a digital unit and an analog unit. The analog unit may include, for example, a plurality of sub units according to operation power, an operation frequency, and the like. The digital unit may be implemented as, for example, at least one processor (for example, digital signal processor (DSP)).

As described above, all or part of the wireless communication unit 210 transmitting and receiving the signal as described above may be referred to as a "transmitter", a "receiver", or a "transceiver". In the following description, a transmission and reception operation performed through a radio channel may be used as a meaning including processing by the wireless communication unit 210.

According to an embodiment, the backhaul communication unit 220 may include various circuitry and provide an interface for communicating with other nodes within the network. The backhaul communication unit 220 may convert a bitstream, which the BS transmits to another node, for example, another access node, another BS, a higher node, or a core network, into a physical signal or convert a physical signal received from another node into a bitstream.

According to an embodiment, the storage unit 230 may include a memory and store data such as a basic program for the operation of the BS, an application program, and configuration information. The storage unit 230 may include, for example, a volatile memory, a nonvolatile memory, or a combination of a volatile memory and a nonvolatile memory. The storage unit 230 may provide the storage data to the controller 240 according to a request from the controller 240.

According to an embodiment, the controller 240 may include various processing/control circuitry and control the overall operation of the BS. The controller 240 may transmit and receive a signal through, for example, the wireless communication unit 210 and/or the backhaul communication unit 220. The controller 240 may record data in the storage unit 230 or read the data. The controller 240 may perform the functions of a protocol stack required for communication standards. The protocol stack may be included in the wireless communication unit 210 according to another implementation example. The controller 240 may include at least one processor.

Figure 3:
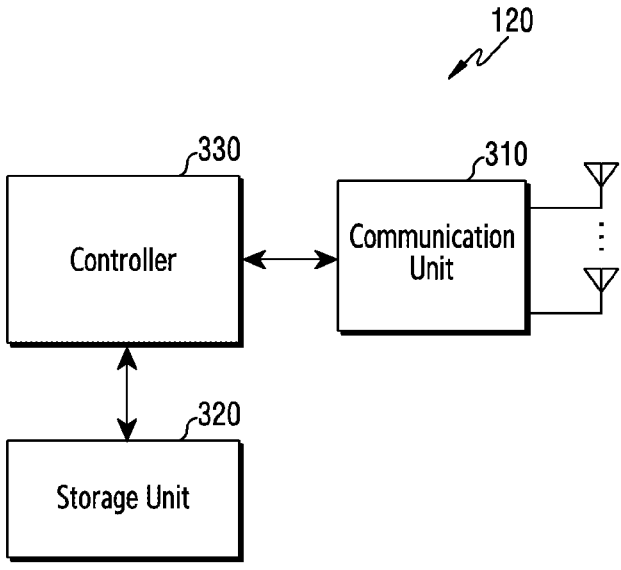
FIG. 3 is a block diagram illustrating an example configuration of a use equipment in a wireless communication system according to various embodiments.

FIG. 3 is a block diagram illustrating an example configuration of a terminal in a wireless communication system according to various embodiments. The suffix "-unit" or "-er" used hereinafter may refer to a unit for processing at least one function or operation, and may be implemented as hardware, software, or a combination of hardware and software.

Figure 5:
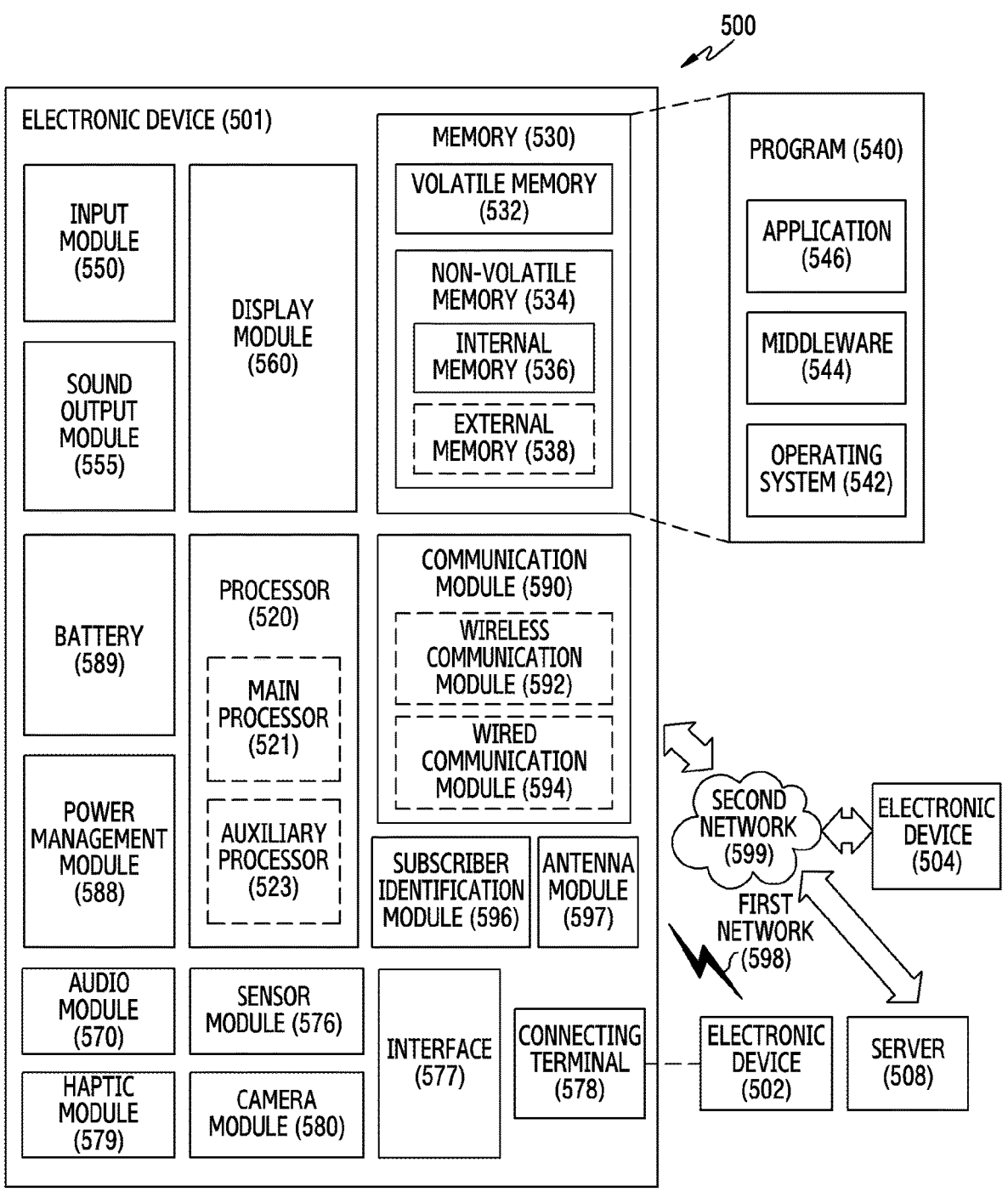
FIG. 5 is a block diagram illustrating an example electronic device in a network environment in a wireless communication system according to various embodiments.
Figure 6:
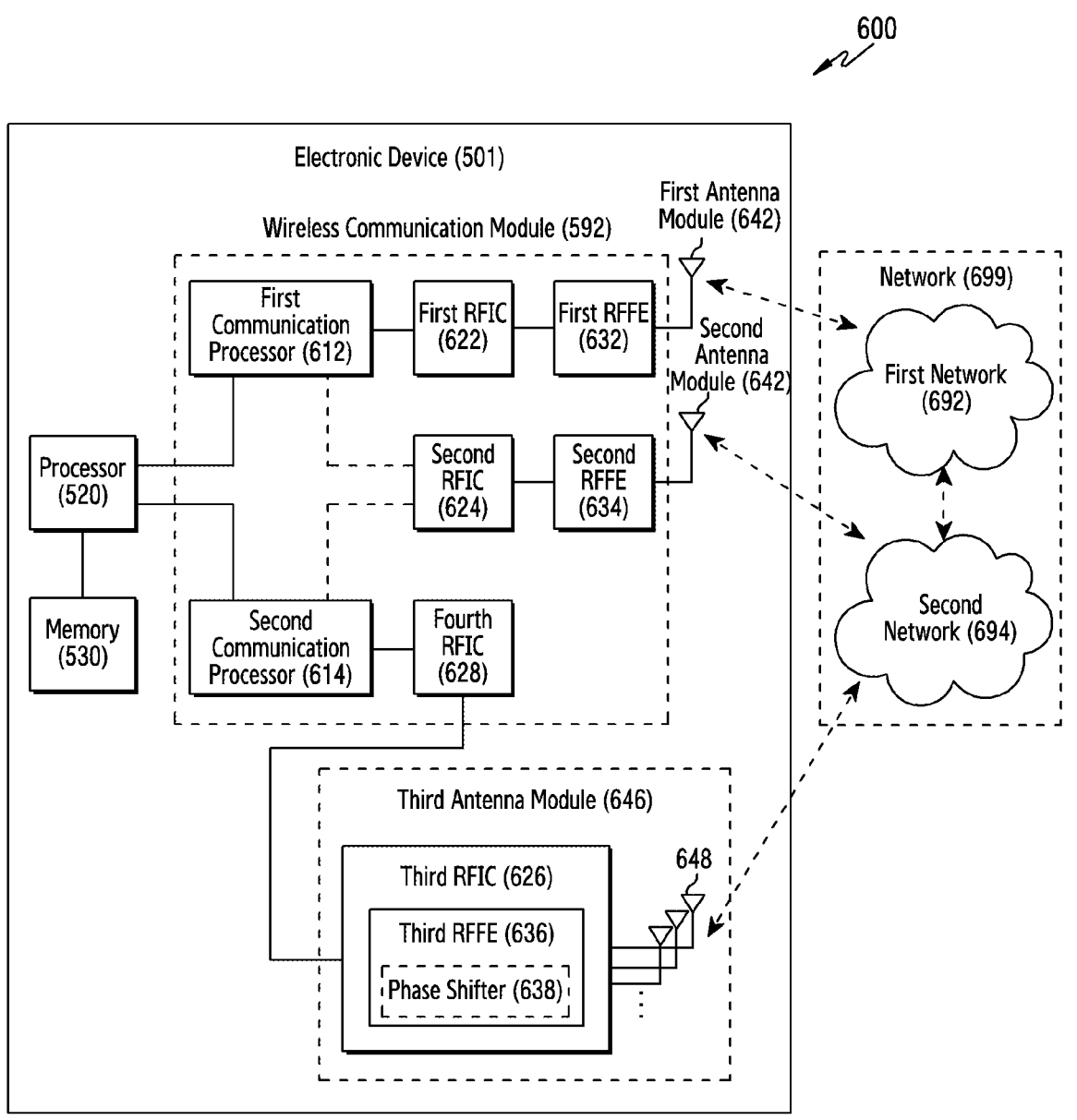
FIG. 6 is a block diagram illustrating an example configuration of a communication module of an electronic device supporting communication with a plurality of radio networks according to various embodiments.

Referring to FIG. 3, a UE (for example, the first UE 120 and/or the second UE 130 of FIG. 1 or an electronic device 501 of FIG. 5) according to an embodiment may include a communication unit (e.g., including communication circuitry) 310 (for example, a communication unit 590 of FIG. 5 or a wireless communication module 592 of FIG. 6), a storage unit (e.g., a memory) 320 (for example, a memory 530 of FIG. 5), and a controller (e.g., including processing/control circuitry) 330 (for example, a processor 520 of FIG. 5 or a first communication processor 612 or a second communication processor 614 of FIG. 6).

According to an embodiment, the communication unit 310 may include various communication circuitry and perform functions for transmitting and receiving a signal through a radio channel. The communication unit 310 may perform a function for conversion between a baseband signal and a bitstream according to a physical layer standard of the system. The communication unit 310 may generate complex symbols by encoding and modulating a transmission bitstream in data transmission or may reconstruct a reception bitstream by demodulating and decoding a baseband signal in data reception. The communication unit 310 may up-convert the baseband signal into an RF signal and then transmit the RF signal through an antenna, or down-convert the RF signal received through antenna into a baseband signal. The communication unit 310 may include at least one of, for example, a transmission filter, a reception filter, an amplifier, a mixer, an oscillator, a DAC, and an ADC.

According to an embodiment, the communication unit 310 may include a plurality of transmission and reception paths. The communication unit 310 may include at least one antenna array including a plurality of antenna elements. On the hardware side, the communication unit 310 may include a digital circuit and an analog circuit (for example, a radio frequency integrated circuit (RFIC)). The digital circuit and the analog circuit may be implemented as a single package. The communication unit 310 may include a plurality of RF chains. The communication unit 310 may perform beamforming.

According to an embodiment, the communication unit 310 may include different communication modules for processing signals in different frequency bands. The communication unit 310 may include a plurality of communication modules in order to support a plurality of different radio access technologies. The different radio access technologies may be applied to a network, for example, Bluetooth low energy (BLE), wireless fidelity (Wi-Fi), Wi-Fi Gigabyte (WiGig), cellular network (for example, long-term evolution (LTE)), and the like. The different frequency bands may include a super high frequency (SHF) (for example, 2.5 GHz and 5 Ghz) band and a millimeter (mm) wave (for example, 60 GHz) band.

As described above, all or part of the communication unit 310 may be referred to as, for example, a "transmitter", a "receiver", or a "transceiver" In the following description, a transmission and reception operation performed through a radio channel may be used as a meaning including an operation performed by the communication unit 310.

According to an embodiment, the storage unit 320 may include a memory and store data such as a basic program for the operation of the UE, an application program, and configuration information. The storage unit 320 may include, for example, a volatile memory, a nonvolatile memory, or a combination of a volatile memory or a nonvolatile memory. The storage unit 320 may provide the stored data according to a request from the controller 330.

According to an embodiment, the controller 330 may include various processing/control circuitry and control the overall operation of the UE. The controller 330 may transmit and receive a signal through, for example, the communication unit 310. The controller 330 may record data in the storage unit 320 or read the data. The controller 330 may perform functions of a protocol stack required for communication standards. To this end, the controller 330 may include at least one processor or microprocessor or may be a part of the processor. The part of the communication unit 310 and/or the controller 330 may be referred to as a communications processor (CP). According to various embodiments, the controller 330 may further include a mode determination unit for distributively determining a mode of the RF module. The controller 330 may control, for example, the UE to perform operations according to various embodiments described below.

Figure 4:
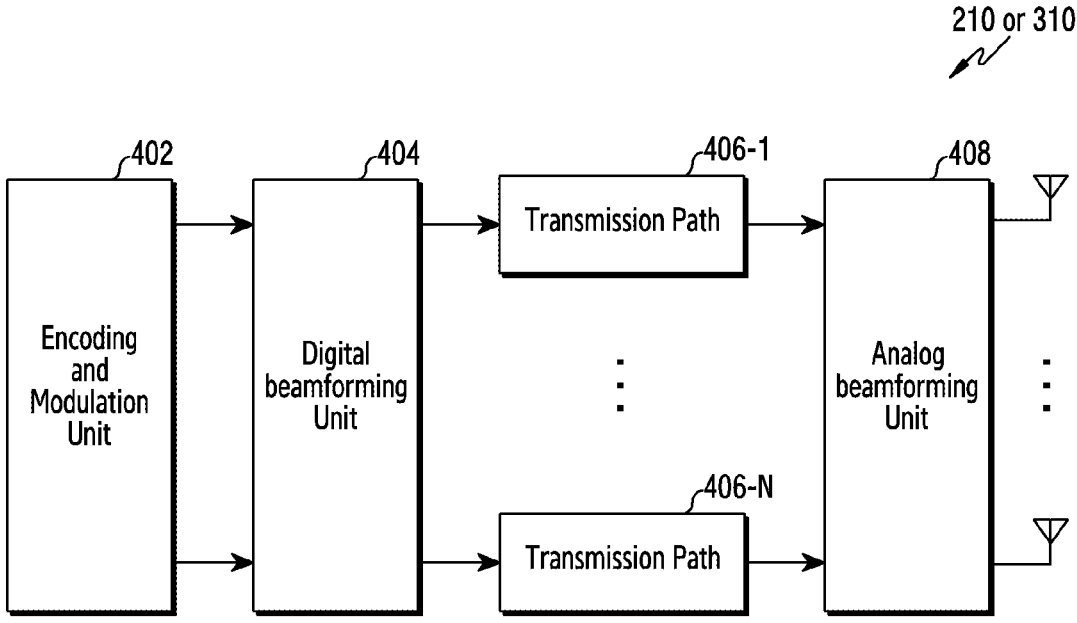
FIG. 4 is a block diagram illustrating an example configuration of a communication unit in a wireless communication system according to various embodiments.

FIG. 4 is a block diagram illustrating an example configuration of a communication unit (for example, the wireless communication unit 210 of FIG. 2 and/or the communication unit 310 of FIG. 3) according to various embodiments. For example, FIG. 4 illustrates elements for performing beamforming as the part of the wireless communication unit 210 of FIG. 2 or the communication unit 310 of FIG. 3.

Referring to FIG. 4, the wireless communication unit 210 and/or the communication unit 310 according to an embodiment may include an encoding and modulation unit (e.g., including circuitry) 402, a digital beamforming unit (e.g., including various beamforming circuitry) 404, a plurality of transmission paths 406-1 to 406-N, and an analog beamforming unit (e.g., including various beamforming circuitry) 408.

According to an embodiment, the encoding and modulation unit 402 may include various circuitry and perform channel encoding. For the channel encoding, the encoding and modulation unit 402 may use a channelization code such as a low-density parity check (LDPC) code, a convolution code, or a polar code. The encoding and modulation unit 402 may generate modulation symbols by performing constellation mapping.

According to an embodiment, the digital beamforming unit 404 may include various beamforming circuitry and perform beamforming for a digital signal (for example, modulation symbols). The digital beamforming unit 404 may multiply the modulation symbols by beamforming weights and output the result. The beamforming weights may be used for changing, for example, the size and phase of the signal, and may be referred to as a 'preceding matrix' or a 'precoder'. The digital beamforming unit 404 may output digitally beamformed modulation symbols through the plurality of transmission paths 406-1 to 406-N. At this time, according to a multiple-input multiple-output (MIMO) transmission scheme, the modulation symbols may be multiplexed, or the same modulation symbols may be provided to the plurality of transmission paths 406-1 to 406-N.

According to an embodiment, the plurality of transmission paths 406-1 to 406-N may convert the digitally beamformed digital signals into analog signals. The plurality of transmission paths 406-1 to 406-N may include an inverse fast Fourier transform (IFFT) calculator, a cyclic prefix (CP) inserter, a DAC, and an up-converter. The CP inserter is for an orthogonal frequency division multiplexing (OFDM) scheme, and may be omitted when another physical layer scheme (for example, a filter bank multi-carrier (FBMC)) is applied. The plurality of transmission paths 406-1 to 406-N may provide independent signal-processing processes for a plurality of streams generated through the digital beamforming. However, depending on an implementation scheme, some of the elements of the plurality of transmission paths 406-1 to 406-N may be used in common.

According to an embodiment, the analog beamforming unit 408 may include various beamforming circuitry and perform beamforming for the analog signals. For example, the analog beamforming unit 440 may be variously configured according to the connection structure between the plurality of transmission paths 406-1 to 406-N and antennas. The plurality of transmission paths 406-1 to 406-N may be connected to, for example, one antenna array. In another example, the plurality of transmission paths 406-1 to 406-N may be adaptively connected to one antenna array or two or more antenna arrays.

FIG. 5 is a block diagram illustrating an example electronic device 501 in a network environment 500 according to various embodiments.

Referring to FIG. 5, the electronic device 501 in the network environment 500 may communicate with an electronic device 502 via a first network 598 (e.g., a short-range wireless communication network), or at least one of an electronic device 504 or a server 508 via a second network 599 (e.g., a long-range wireless communication network). According to an embodiment, the electronic device 501 may communicate with the electronic device 504 via the server 508. According to an embodiment, the electronic device 501 may include a processor 520, memory 530, an input module 550, a sound output module 555, a display module 560, an audio module 570, a sensor module 576, an interface 577, a connecting terminal 578, a haptic module 579, a camera module 580, a power management module 588, a battery 589, a communication module 590, a subscriber identification module (SIM) 596, or an antenna module 597. In various embodiments, at least one of the components (e.g., the connecting terminal 578) may be omitted from the electronic device 501, or one or more other components may be added in the electronic device 501. In various embodiments, some of the components (e.g., the sensor module 576, the camera module 580, or the antenna module 597) may be implemented as a single component (e.g., the display module 560).

The processor 520 may execute, for example, software (e.g., a program 540) to control at least one other component (e.g., a hardware or software component) of the electronic device 501 coupled with the processor 520, and may perform various data processing or computation. According to an embodiment, as at least part of the data processing or computation, the processor 520 may store a command or data received from another component (e.g., the sensor module 576 or the communication module 590) in volatile memory 532, process the command or the data stored in the volatile memory 532, and store resulting data in non-volatile memory 534. According to an embodiment, the processor 520 may include a main processor 521 (e.g., a central processing unit (CPU) or an application processor (AP)), or an auxiliary processor 523 (e.g., a graphics processing unit (GPU), a neural processing unit (NPU), an image signal processor (ISP), a sensor hub processor, or a communication processor (CP)) that is operable independently from, or in conjunction with, the main processor 521. For example, when the electronic device 501 includes the main processor 521 and the auxiliary processor 523, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display module 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera module 580 or the communication module 590) functionally related to the auxiliary processor 523. According to an embodiment, the auxiliary processor 523 (e.g., the neural processing unit) may include a hardware structure specified for artificial intelligence model processing. An artificial intelligence model may be generated by machine learning. Such learning may be performed, e.g., by the electronic device 501 where the artificial intelligence is performed or via a separate server (e.g., the server 508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input module 550 may receive a command or data to be used by another component (e.g., the processor 520) of the electronic device 501, from the outside (e.g., a user) of the electronic device 501. The input module 550 may include, for example, a microphone, a mouse, a keyboard, a key (e.g., a button), or a digital pen (e.g., a stylus pen).

The sound output module 555 may output sound signals to the outside of the electronic device 501. The sound output module 555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 560 may visually provide information to the outside (e.g., a user) of the electronic device 501. The display module 560 may include, for example, a display, a hologram device, or a projector and control circuitry to control a corresponding one of the display, hologram device, and projector. According to an embodiment, the display module 560 may include a touch sensor adapted to detect a touch, or a pressure sensor adapted to measure the intensity of force incurred by the touch.

The audio module 570 may convert a sound into an electrical signal and vice versa. According to an embodiment, the audio module 570 may obtain the sound via the input module 550, or output the sound via the sound output module 555 or a headphone of an external electronic device (e.g., an electronic device 502) directly (e.g., wiredly) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. According to an embodiment, the sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., wiredly) or wirelessly. According to an embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector).

The haptic module 579 may convert an electrical signal into a mechanical stimulus (e.g., a vibration or a movement) or electrical stimulus which may be recognized by a user via his tactile sensation or kinesthetic sensation. According to an embodiment, the haptic module 579 may include, for example, a motor, a piezoelectric element, or an electric stimulator.

The camera module 580 may capture a still image or moving images. According to an embodiment, the camera module 580 may include one or more lenses, image sensors, image signal processors, or flashes.

The power management module 588 may manage power supplied to the electronic device 501. According to an embodiment, the power management module 588 may be implemented as at least part of, for example, a power management integrated circuit (PMIC).

The battery 589 may supply power to at least one component of the electronic device 501. According to an embodiment, the battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the application processor (AP)) and supports a direct (e.g., wired) communication or a wireless communication. According to an embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™ wireless-fidelity (Wi-Fi) direct, or infrared data association (IrDA)) or the second network 599 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit or receive a signal or power to or from the outside (e.g., the external electronic device) of the electronic device 501. According to an embodiment, the antenna module 597 may include an antenna including a radiating element including a conductive material or a conductive pattern formed in or on a substrate (e.g., a printed circuit board (PCB)). According to an embodiment, the antenna module 597 may include a plurality of antennas (e.g., array antennas). In such a case, at least one antenna appropriate for a communication scheme used in the communication network, such as the first network 598 or the second network 599, may be selected, for example, by the communication module 590 (e.g., the wireless communication module 592) from the plurality of antennas.

The signal or the power may then be transmitted or received between the communication module 590 and the external electronic device via the selected at least one antenna. According to an embodiment, another component (e.g., a radio frequency integrated circuit (RFIC)) other than the radiating element may be additionally formed as part of the antenna module 597.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 501 and the external electronic device 504 via the server 508 coupled with the second network 599. Each of the electronic devices 502 or 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, mobile edge computing (MEC), or client-server computing technology may be used, for example. The electronic device 501 may provide ultra low-latency services using, e.g., distributed computing or mobile edge computing. In an embodiment, the external electronic device 504 may include an internet-of-things (IoT) device. The server 508 may be an intelligent server using machine learning and/or a neural network. According to an embodiment, the external electronic device 504 or the server 508 may be included in the second network 599. The electronic device 501 may be applied to intelligent services (e.g., smart home, smart city, smart car, or healthcare) based on 5G communication technology or IoT-related technology.

FIG. 6 is a block diagram illustrating an example configuration of a communication module 600 of the electronic device 501 supporting communication with a plurality of wireless networks according to various embodiments.

Referring to FIG. 6, the electronic device 501 may include a first communication processor (CP) (e.g., including processing circuitry) 612, a second CP (e.g., including processing circuitry) 614, a first RFIC 622, a second RFIC 624, a third RFIC 626, a fourth RFIC 628, a first radio frequency front end (RFFE) 632, a second RFFE 634, a first antenna module 642, a second antenna module 644, and antennas 648. The electronic device 501 may further include the processor (e.g., including processing circuitry) 520 and the memory 530. A second network 199 may include a first cellular network 692 and a second cellular network 694.

According to an embodiment, the electronic device 501 may further include at least one element among the elements illustrated in FIG. 1, and the second network 199 may further include at least one other network. According to an embodiment, the first CP 612, the second CP 614, the first RFIC 622, the second RFIC 624, the fourth RFIC 628, the first RFFE 632, and the second RFFE 634 may configure at least a portion of the wireless communication module 192. According to an embodiment, the fourth RFIC 628 may be omitted or may be included as a portion of the third RFIC 626.

The first CP 612 may include various processing circuitry and support establishment of a communication channel in a band to be used for wireless communication with the first cellular network 692 and legacy network communication through the established communication channel. According to various embodiments, the first cellular network 692 may be a legacy network including a second generation (2G), 3G, 4G, or long-term evolution (LTE) network. The second CP 614 may include various processing circuitry and support establishment of a communication channel corresponding to a predetermined band (for example, about 6 GHz to about 60 GHz) among the bands to be used for wireless communication with the second cellular network 694 and support 5G network communication through the established communication channel. According to various embodiments, the second cellular network 694 may be a 5G network defined by the 3GPP. In addition, according to an embodiment, the first CP 612 or the second CP 614 may support establishment of a communication channel corresponding to another predetermined band (for example, equal to or lower than about 6 GHz) among the bands to be used for wireless communication with the second cellular network 694 and 5G network communication through the established communication channel According to an embodiment, the first CP 612 and the second CP 614 may be implemented within a single chip or a single package. According to various embodiments, the first CP 612 or the second CP 614 may be configured within a single chip or a single package together with the processor 520, the auxiliary processor 123, or the communication module 190. According to an embodiment, the first CP 612 and the second CP 614 may be directly or indirectly connected to each other by an interface (not shown) and may provide or receive data or a control signal unidirectionally or bidirectionally.

In transmission, the first RFIC 622 may convert a baseband (BB) signal generated by the first CP 612 into a radio frequency (RF) signal in about 700 MHz to about 3 GHz used for the first cellular network 692 (for example, legacy network). In reception, the RF signal may be acquired from the first cellular network 692 (for example, legacy network) through an antenna (for example, the first antenna module 642) and may be preprocessed through the RFFE, (for example, first RFFE 632). The first RFIC 622 may convert the preprocessed RF signal into a BB signal to be processed by the first CP 612.

In transmission, the second RFIC 624 may convert a BB signal generated by the first CP 612 or the second CP 614 into an RF signal (hereinafter, referred to as a 5G Sub6 RF signal) in a Sub6 band (for example, equal to or lower than about 6 GHz) used for the second cellular network 694 (for example, 5G network). In reception, a 5G Sub6 RF signal may be acquired from the second cellular network 694 (for example, 5G network) through an antenna (for example, the second antenna module 644) and may be preprocessed through the RFFE (for example, second RFFE 634). The second RFIC 624 may convert the preprocessed 5G Sub6 RF signal into a BB signal to be processed by the corresponding CP among the first CP 612 or the second CP 614.

In transmission, the third RFIC 626 may convert a BB signal generated by the second CP 614 into an RF signal (hereinafter, referred to as a 5G Above6 RF signal) in a 5G Above6 band (for example, from about 6 GHz to about 60 GHz) to be used for the second cellular network 694 (for example, the 5G network). In reception, the third RFIC 626 may preprocess the 5G Above6 RF signal acquired from the second cellular network 694 (for example, 5G network) through the antenna (for example, antenna 648) and convert the preprocessed 5G Above6 RF signal into a BB signal to be processed by the second CP 614. According to an embodiment, the third RFFE 636 may be configured as a portion of the third RFIC 626.

According to an embodiment, the electronic device 501 may include the fourth RFIC 626 separately from the third RFIC 628 or as at least a portion thereof. In this case, after converting the BB signal generated by the second CP 614 into an RF signal (hereinafter, referred to as an IF signal) in an intermediate frequency (IF) band (for example, about 9 GHz to about 11 GHz), the fourth RFIC 628 may transmit the IF signal to the third RFIC 626. The third RFIC 626 may convert the IF signal into a 5G Above6 RF signal. In reception, the 5G Above6 RF signal may be received from the second cellular network 694 (for example, 5G network) through the antenna (for example, antenna 648) and converted into an IF signal by the third RFIC 626. The fourth RFIC 628 may convert the IF signal into a BB signal to be processed by the second CP 614.

According to an embodiment, the first RFIC 622 and the second RFIC 624 may be implemented as at least a portion of a single chip or a single package. According to an embodiment, the first RFFE 632 and the second RFFE 634 may be implemented as at least a portion of a single chip or a single package. According to an embodiment, at least one of the first antenna module 642 or the second antenna module 644 may be omitted or may be combined with another antenna module to process RF signals in a plurality of corresponding frequency bands.

According to an embodiment, the third RFIC 626 and the antenna 648 may be disposed on the same substrate to configure a third antenna module 646. For example, the wireless communication module 192 or the processor 520 may be disposed on a first substrate (for example, a main PCB or a first printed circuit board). In this case, the third RFIC 626 may be disposed in a partial area (for example, bottom side) of a second substrate (for example, a sub PCB or a second printed circuit board) separated from the first substrate and the antennas 648 may be disposed in another partial area (for example, top side) to configure the third antenna module 646. By placing the third RFIC 626 and the antennas 648 on the same substrate, it is possible to reduce the length of a transmission line therebetween. This may be to reduce, for example, loss (for example, attenuation) of the signal in a frequency band (for example, about 6 GHz to about 60 GHz) used for 5G network communication by a transmission line. Accordingly, the electronic device 501 may improve a quality or speed of communication with the second cellular network 694 (for example, a 5G network). According to an embodiment, the included third RFFE 636 may be separated from the third RFIC 626 and configured as a separate chip. For example, the third antenna module 646 may include the third RFFE 636 and the antennas 648 on the second substrate. For example, the third RFIC 626 from which the third RFFE 636 is separated in the third antenna module 646 may or may not be disposed on the second substrate.

According to an embodiment, the antennas 648 may be configured as an antenna array including a plurality of antenna elements which can be used for beamforming. In this case, the third RFIC 626 may include, for example, a plurality of phase shifters 638 corresponding to the plurality of antenna elements as a part of the third RFFE 636. In transmission, each of the plurality of phase shifters 638 may convert a phase of the 5G Above6 RF signal to be transmitted to the outside of the electronic device 501 (for example, a base station of the 5G network) through a corresponding antenna element. In reception, the plurality of phase shifters 638 may convert the phase of the 5G Above6 RF signal received from the outside through the corresponding antenna element into the same phase or substantially the same phase. This enables transmission or reception through beamforming between the electronic device 501 and the outside.

According to an embodiment, the third antenna module 646 may up-convert the transmission signal of the baseband provided by the second communication processor 614. The third antenna module 646 may transmit the RF transmission signal generated by up conversion through at least two transmission and reception antenna elements among the plurality of antenna elements 648. The third antenna module 646 may receive the RF reception signal through at least two transmission and reception antenna elements and at least two reception antenna elements among the plurality of antenna elements 648. The third antenna module 646 may down-convert the RF reception signal and generate the reception signal of the baseband. The third antenna module 646 may output the reception signal of the baseband generated by down-conversion to the second communication processor 614. The third antenna module 646 may include at least two transmission and reception circuits corresponding to at least two transmission and reception antenna elements in one-to-one correspondence and at least two reception circuits corresponding to at least two reception antenna elements in one-to-one correspondence.

The second cellular network 694 (for example, 5G network) may operate independently from the first cellular network 692 (for example, legacy network) (for example, standalone (SA)) or operate through a connection thereto (for example, non-standalone (NSA)). For example, in the 5G network, only an access network (for example, a 5G radio access network (RAN) or a next generation RAN (NG RAN)) may exist without a core network (for example, a next generation core (NGC)). In this case, the electronic device 501 may access the access network of the 5G network and then access an external network (for example, Internet) under the control of the core network (for example, evolved packed core (EPC) of the legacy network. Protocol information (for example, LTE protocol information) for communication with the legacy network and protocol information (for example, new radio (NR) protocol information) for communication with the 5G network may be stored in the memory 630 and may be accessed by another element (for example, the processor 520, the first CP 612, or the second CP 614).

According to various embodiments, the processor 520 of the electronic device 501 may execute one or more instructions stored in the memory 530. The processor 520 may include at least one of a circuit for processing data, for example, an integrated circuit (IC), an arithmetic logic unit (ALU), a field programmable gate array (FPGA), and a large scale integration (LSI). The memory 530 may store data related to the electronic device 501. The memory 530 may include a volatile memory such as a random access memory (RAM) including a static random access memory (SRAM) or a dynamic RAM (DRAM) or a nonvolatile memory such as a read only memory (ROM), a magneto-resistive RAM (MRAM), a spin-transfer torque (STT)-MRAM, a phase-change RAM (PRAM), a resistive RAM (RRAM), a ferro-electric RAM (FeRAM), a flash memory, an embedded multimedia card (eMMC), and a solid state drive (SSD).

According to various embodiments, the memory 530 may store instructions related to applications and instructions related to an operating system (OS). The operating system is system software executed by the processor 520. The processor 520 may manage hardware components included in the electronic device 501 by executing the operating system. The operating system is an application that is the remaining software except for the system software and may provide an application programming interface (API).

According to various embodiments, one or more applications which are sets of a plurality of instructions may be installed within the memory 530. The installation of the application in the memory 530 may refer, for example, to the application being stored in a format which can be executed by the processor 520 connected to the memory 530.

Figure 7:
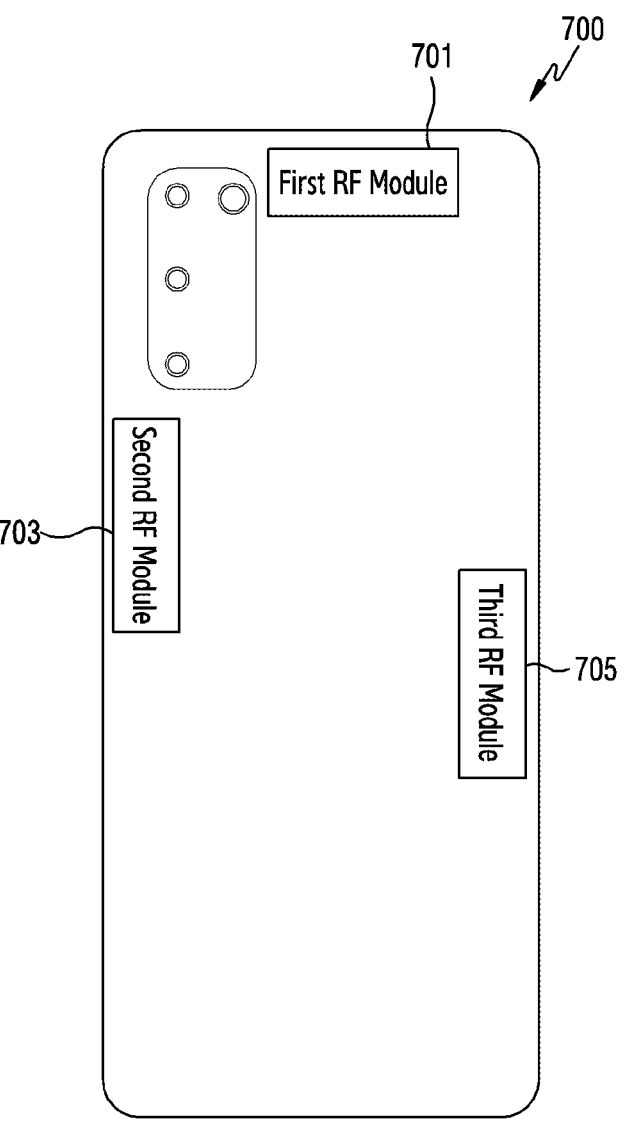
FIG. 7 is a diagram illustrating an example configuration of a UE including a plurality of radio frequency (RF) modules in a wireless communication system according to various embodiments.

FIG. 7 is a diagram illustrating an example configuration of a UE 700 (for example, the first UE 120 or the second UE 130 of FIG. 1 or the electronic device 501 of FIG. 5) including a plurality of radio frequency (RF) modules (for example, the third antenna module 646 of FIG. 6) in a wireless communication system according to various embodiments.

Referring to FIG. 7, the UE 700 according to an embodiment may include a plurality of RF modules 701, 703, and 705. In an embodiment, each of the plurality of RF modules 701, 703, and 705 may correspond to the third antenna module 646 of FIG. 6. The plurality of RF modules 701, 703, and 705 may refer, for example, to wireless communication modules including an antenna, a switch, a duplexer, a filter, and an amplifier. According to an embodiment of the disclosure, the UE 700 may measure temperature of the RF modules 701, 703, and 705 using at least one temperature sensor (for example, the sensor module 576 of FIG. 5). At least one temperature sensor may be included in, for example, the plurality of RF modules 701, 703, and 705 or at least one of the plurality of RF modules 701, 703, and 705, attached to the surface thereof, located in proximity to the of RF modules 701, 703, and 705, included in the antenna module, or attached to the surface thereof.

According to an embodiment of the disclosure, the UE 700 may communicate with the network and/or the BS (for example, the BS 110 of FIG. 1) through the first RF module 701. Temperature of the first RF module 701 may increase due to the operation using power. The UE 700 may compare a preset threshold value with a temperature value of the first RF module 701 and, when the measured temperature value of the first RF module 701 is higher than the threshold value, control switching of the RF module to use at least one of the second RF module 703 or the third RF module 705.

According to an embodiment of the disclosure, the first RF module 701 may be disposed in a right and left direction on the upper part of the back side of the UE 700, the second RF module 703 may be disposed in an up and down direction on the left part of the back side of the UE 700, and the third RF module 705 may be disposed in an up and down direction on the right part of the back side of the UE 700.

In an embodiment of the disclosure, it is illustrated that the plurality of RF modules 701, 703, and 705 are disposed in the right and left direction or the up and down direction on the upper part and/left/right part of the back side of the UE 700. However, the locations of the RF modules 701, 703, and 705 may be changed according to a design. FIG. 7 illustrates three RF modules 701, 703, and 705, but the number of RF modules may be changed to be larger or smaller according to a user's intent.

Figure 8:
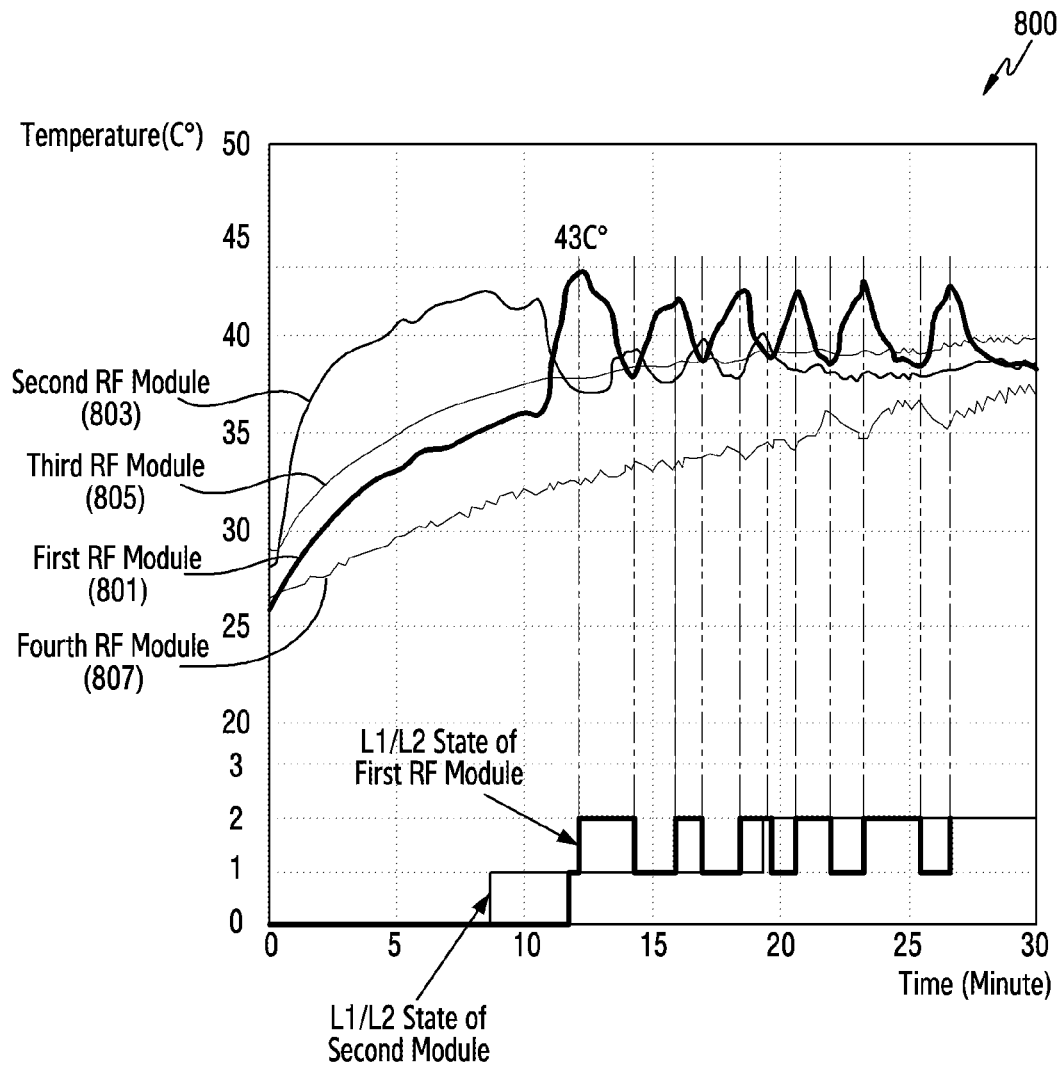
FIG. 8 is a graph illustrating an example of a change in temperature of an RF module according to switch on or off in a wireless communication system according to various embodiments.

FIG. 8 is a graph 800 illustrating examples of temperature changes of RF modules (for example, the first to third RF modules 701, 703, and 705 of FIG. 7) according to switch on or off in a wireless communication system according to various embodiments.

Referring to FIG. 8, the graph 800 according to an embodiment is an example of the temperature changes of the RF modules according to on or off of RF module switches over time according to an embodiment. The horizontal axis indicates time (unit: minute) and the vertical axis indicates temperature (unit: ° C.). Referring to the graph 800, it may be identified that temperature of a first RF module 801, a second RF module 803, a third RF module 805, and a fourth RF module 807 varies depending on the time. In the graph 800, an alternated long and short dash line indicates a time point at which a switch (hereinafter, referred to as a 'first RF module switch') for controlling the operation of the first RF module 801 is turned on and an alternate long and two short dashes line indicates a time point at which the first RF module switch is turned off. The lower part of the graph 800 shows level 1 (L1)/level 2 (L2) states of the first RF module 801 and the second RF module 803. L1 indicates the state in which the switch of the RF module is turned 'off', and L2 indicates the state in which the switch of the RF module is turned 'on'.

According to an embodiment, when the first RF module switch is turned on and the second RF module switch is turned off, the UE may perform control to switch a serving RF module from the first RF module 801 to the second RF module 803. Further, when the second RF module switch is turned on and the first RF module switch is turned off, the UE may perform control to switch the serving RF module from the second RF module 803 to the first RF module 801. The serving RF module may include, for example, an RF module which is being used for beamforming. Alternatively, the serving RF module may include an RF module which has relatively higher power consumption than other RF modules.

According to an embodiment of the disclosure, when switches of both the first RF module 801 and the second RF module 803 are on like the state at about 21 minutes of the graph, the UE may control switching of the RF module to use the third RF module 805.

According to an embodiment of the disclosure, when an electric field is good due to no movement of the UE in the case in which the first RF module 801 is used and the case in which the second RF module 803 is used, the UE may switch the RF module to operate the third RF module 805 in which a reception electric field is relatively low.

According to various embodiments of the disclosure, the UE may perform control to execute a module switching operation in low threshold module temperature through a method of controlling the threshold value for temperature of the RF module.

Figure 9A:
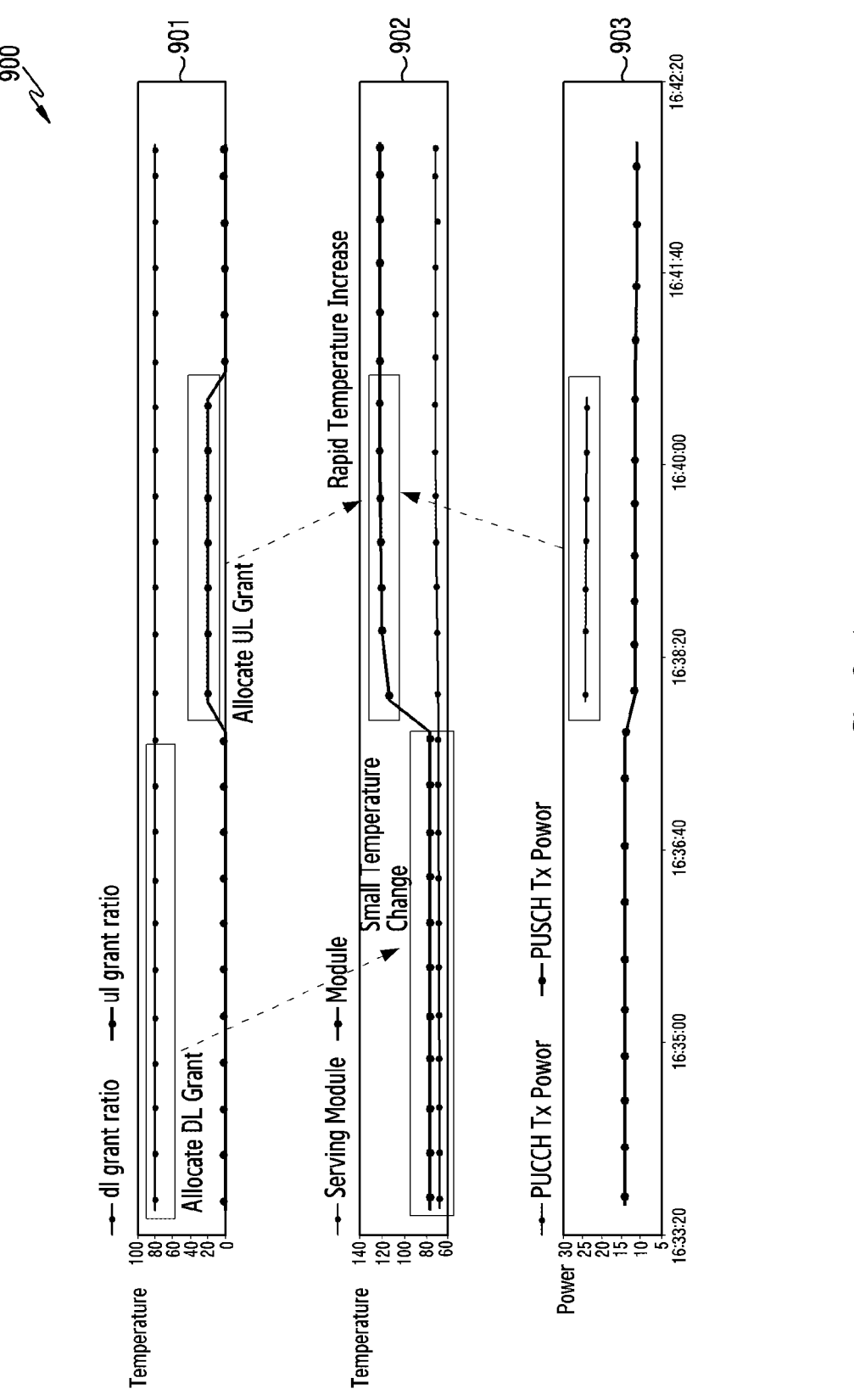
FIG. 9A is a graph illustrating an example of a change in temperature of an RF module for a downlink and uplink operation in a wireless communication system according to various embodiments.

FIG. 9A includes graphs 900 illustrating examples of temperature changes of RF modules (for example, the first to third RF modules 701, 703, and 705 of FIG. 7) for the downlink and uplink operation in a wireless communication system according to various embodiments.

The horizontal axis of FIG. 9A indicates the time (unit: second) and the vertical axis indicates the temperature (unit: ° C. or power (unit: W)). FIG. 9A illustrates a graph 901 about a downlink allocation ratio and an uplink allocation ratio, a graph 902 indicating a temperature change of a serving RF module, and a graph 903 about transmission of a physical uplink control channel (PUCCH) and a physical uplink control channel (PUSCH).

Referring to FIG. 9A, when the UE receives data according to allocation of a downlink (DL) grant, it may be identified that a temperature increase of the serving RF module is not large and a temperature change is small according to an embodiment. Thereafter, when the UE performs PUSCH transmission through allocated resources by uplink (UL) grant allocation, it may be identified that temperature of the RF module rapidly increases.

Figure 9B:
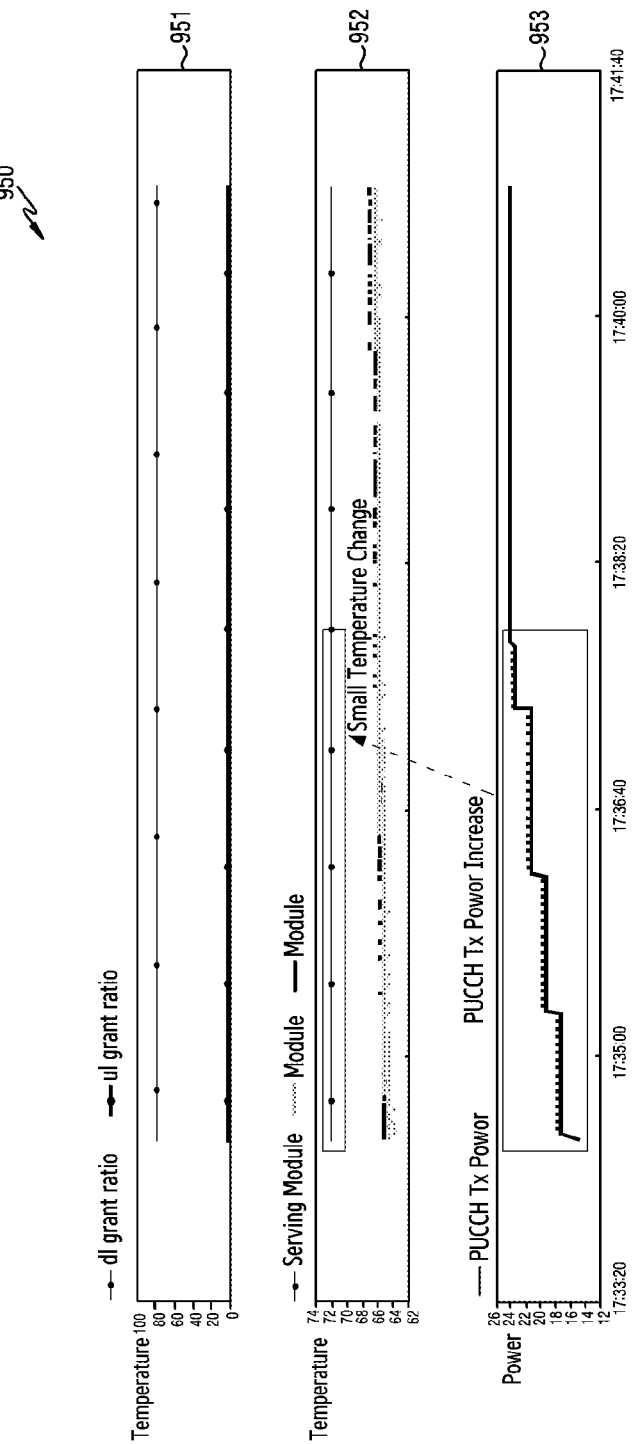
FIG. 9B is a graph illustrating an example of a change in temperature of an RF module according to a change in physical uplink control channel (PUCCH) transmission power in a wireless communication system according to various embodiments.

FIG. 9B includes graphs 950 illustrating examples of temperature changes of RF modules (for example, the first to third RF modules 701, 703, and 705 of FIG. 7) depending on a physical uplink control channel (PUCCH) transmission power change in a wireless communication system according to various embodiments.

The horizontal axis of FIG. 9B indicates the time (unit: second) and the vertical axis indicates the temperature (unit: ° C. or power (unit: W)). FIG. 9B illustrates a graph 951 about a downlink allocation ratio and an uplink allocation ratio, a graph 952 indicating a temperature change of the serving RF module, and a graph 953 indicating a PUCCH transmission power change.

Referring to FIG. 9B, when the UE according to an embodiment performs PUCCH transmission in order to transmit acknowledge (ACK) for the DL operation, it may be identified that a change in temperature of the RF module of the UE is small if PUCCH transmission power is high (for example, in the case of a weak electric field). Referring to FIGS. 9A and 9B, it may be identified that continuous transmission of an uplink signal on the PUSCH with high power by the UE is a main factor influencing the temperature of the RF module.

Figure 10:
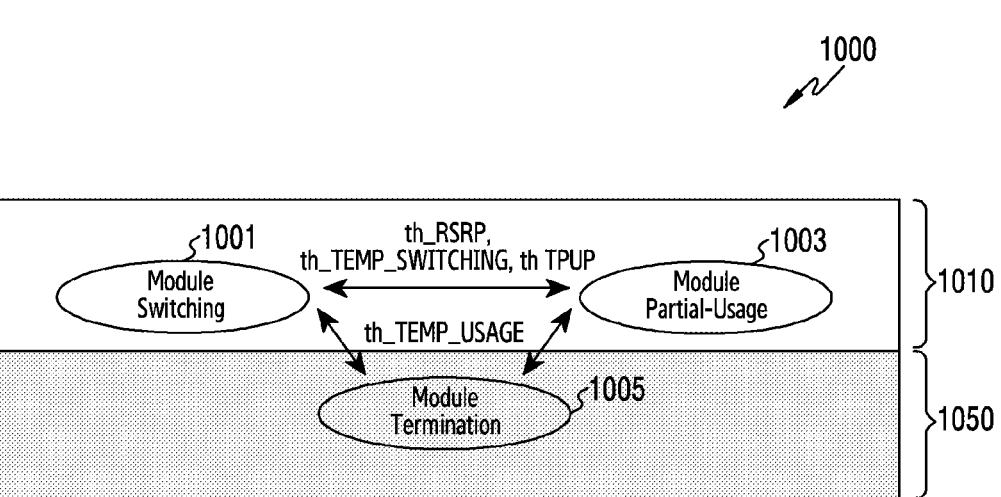
FIG. 10 is a diagram illustrating UE operation modes related to frequency bands in a wireless communication system according to various embodiments.

FIG. 10 is a diagram illustrating example operation modes 1000 of a UE (for example, the first UE 120 or the second UE 130 of FIG. 1 or the electronic device 501 of FIG. 5) related to a frequency band in a wireless communication system according to various embodiments.

Referring to FIG. 10, the UE according to an embodiment may select one of a module switching mode 1001, a module partial usage mode 1003, and a module termination mode 1005 as the operation mode. In order to reduce a temperature increase speed of the RF module or suppress heat concentration in one RF module, the UE may selectively apply the module switching mode 1001, the module partial usage mode 1003, or the module termination mode 1005. The UE may have one threshold value condition for reducing the temperature increase speed of the RF module or suppressing heat concentration in one RF module. In this case, the UE may select the operation mode on the basis of whether at least one threshold value condition is satisfied. The UE may identify at least one threshold value condition or complexly identify a plurality of threshold value conditions in order to select the operation mode.

According to various embodiments, at least one threshold value condition may include at least one of the following conditions.

(1) First section-related information that defines threshold module operation temperature (th_TEMP_USAGE) which is a first threshold value for determining whether to use a serving RF module and a target RF module or a temperature range (2) Second section-related information that defines a threshold RSRP (th_RSRP) which is a second threshold value for identifying a reference signal received power (RSRP) similarity between the serving RF module and the target RF module or an RSRP range (3) Third section-related information that defines threshold switching temperature (th_TEMP_SWITCHING) which is a third threshold value for identifying whether a temperature difference between the serving RF module and the target RF module is a predetermined value or higher or a temperature range (4) Fourth section-related information that defines an average data rate (th_TPUT) which is a fourth threshold value for determining whether a service being used is a service required to have large traffic or an average data rate range According to various embodiments, the UE may select the operation mode from among the module switching mode 1001, the module partial usage mode 1003, or the module termination mode 1005 in consideration of at least one threshold value condition. When selecting the operation mode, the UE may additionally consider the frequency band and/or the type of the network (for example, an LTE network or a new radio (NR) network) which is being used for communication. The frequency band which the UE can use for communication may include, for example, a first frequency band and a second frequency band. The first frequency band and the second frequency band may be different. The UE may provide a communication service with a first network (for example, the LTE network and/or the NR network) in the first frequency band and provide a communication service with a second network (for example, the NR network) in the second frequency band. The UE may operate one or a plurality of RF modules in the first frequency band and/or the second frequency band.

According to an embodiment, the UE may transition from the module switching mode 1001 to the module partial usage mode 1003 or from the module partial usage mode 1003 to the module switching mode 1001 in consideration of at least one of the second threshold value or second section-related information, the third threshold value or third section-related information, and/or the fourth threshold value or fourth section-related information.

According to an embodiment, the UE may transition from the module switching mode 1001 to the module termination mode 1005, from the module termination mode 1005 to the module switching mode 1001, from the module partial usage mode 1003 to the module termination mode 1005, or from the module termination mode 1005 to the module partial usage mode 1003 in consideration of the first threshold value or first section-related information.

According to an embodiment, the module switching mode 1001, the module partial usage mode 1003, or the module termination mode 1005 which the UE can select as the operation mode may be classified into an activation mode for activation in the second frequency band as indicated by reference numeral 1010 and a deactivation mode for deactivation therein as indicated by reference numeral 1050. The activated mode may be a mode in which a communication service, for example, signal transmission and/or reception in the second frequency band can be provided. For example, the activation mode may include the module switching mode 1001 and/or the module partial usage mode 1003. The deactivation mode may be a mode in which a communication service, for example, signal transmission and/or reception in the second frequency band cannot be provided. For example, the deactivation mode may include the module termination mode 1005.

According to an embodiment, the first frequency band and the second frequency band may follow the LTE standard and the 5G NR standard defined by the $3^{rd}$ generation partnership project (3GPP). In the 5G NR standard, the frequency band (frequency range (FR)) for wireless communication is defined as FR1 and FR2. FR1 may include a sub-6 band (for example, 410 MHz to 6 GHz (or 7.125 GHz) and may correspond to the first frequency band in various embodiments of the disclosure. FR2 may include an millimeter wave (mmWave) band (for example, 24.25 GHz to 52.6 GHz) and may correspond to the second frequency band in various embodiments of the disclosure. FR1 may include an LTE frequency band (for example, an LTE support anchor band) allocated for communication in the LTE network and an NR frequency band allocated for communication in the NR network. Thereafter, for convenience, various embodiments of the disclosure are described on the premise that an RF module considering the operation mode operates in the second frequency band. However, the application of various embodiments in which RF modules of the various example embodiments of the disclosure are operated is not limited to the second frequency band, and the application may be similarly expanded to the LTE frequency band and/or the NR frequency band included in the first frequency band.

According to an embodiment of the disclosure, for example, in an environment in which the performance difference between the first RF module and the second RF module is not large, the UE may alternately select the first RF module or the second RF module as the serving RF module in the module switching mode 1001 before temperature of the serving RF module becomes a threshold value or higher. Accordingly, it is possible to prevent and/or reduce the temperature of the serving RF module from rapidly increasing in the module switching mode 1001.

According to an embodiment of the disclosure, the UE may change the frequency band for transmission in an uplink-centric (Tx dominant) service interval from the second frequency band to the first frequency band in the module partial usage mode 1003 in consideration of possibility of a relative rapid increase in temperature of the RF module compared to, for example, the reception operation. On the other hand, the frequency band for reception may remain in the second frequency band.

According to an embodiment of the disclosure, when it is difficult to maintain communication in the second frequency band in the module termination mode 1005, the UE may switch to communication in the first frequency band. For example, when it is difficult to maintain communication in the second frequency band during communication through the NR network, the NR network communication may be performed in the first frequency band.

According to an embodiment of the disclosure, when communication through the NR network cannot be supported, the frequency band for communication may be changed from the second frequency band to the first frequency band (for example, fallback). The fallback may be used as a technical meaning for changing the network performing communication. The fallback may be, for example, an operation for changing the network performing communication from the NR network to the LTE network. In this case, the first frequency band may be designated to, for example, the LTE frequency band among the LTE frequency band and the NR frequency band.

According to various embodiments of the disclosure, the operation mode of the UE (for example, the module switching mode 1001, the module partial usage mode 1003, or the module termination mode 1005) may refer, for example, to the UE operation itself or the operation state. This may be easily understood by those skilled in the art. For example, the module switching mode 1001 may refer, for example, to the UE operation itself or the operation state to switch the serving RF module to one of at least one target RF module before temperature of the serving RF module reaches a threshold value in an environment in which the performance difference between at least two RF modules is not large. In this case, at least two RF modules included in the UE may be alternately selected as the serving RF module. The environment in which the performance difference between the at least two RF modules is not large may indicate, for example, a service environment in which constant communication performance can be maintained regardless of which RF module is selected by the UE as the serving RF modules from among the at least two RF modules in the second frequency band.

According to various embodiments of the disclosure, the operations according to FIGS. 11, 12, 13, 14 and 15 may be understood as operations performed by the controller of the UE (for example, the controller 330 of FIG. 3, the processor 520 of FIG. 5, the first communication processor 612 of FIG. 6, or the second communication processor 614 of FIG. 6). Hereinafter, for convenience, it is described that all operations are performed by the UE. However, a hardware element of the UE performing each operation can be sufficiently predicted by those skilled in the art. Further, in the following description, an antenna module may be understood as an element which is the same as or similar to the RF module in the above description.

FIG. 11 is a flowchart 1100 illustrating an example method of operating a UE (for example, the first UE 120 or the second UE 130 of FIG. 1 or the electronic device 501 of FIG. 5) in a wireless communication system according to various embodiments.

Referring to FIG. 11, in operation 1101 according to an embodiment, the UE may identify whether to operate in an antenna module termination mode (for example, the module termination mode 1005 of FIG. 10) on the basis of temperature of a plurality of antenna modules (for example, the first RF module 701, the second RF module 703, and the third RF module 705 of FIG. 7) and threshold module operation temperature (for example, the first threshold value in the description of FIG. 10). The plurality of antenna modules may include, for example, at least one serving antenna module and at least one target antenna module.

According to an embodiment of the disclosure, the UE may measure temperature of the plurality of antenna modules and identify whether all of the measured temperature of the plurality of antenna modules is higher than or equal to threshold module operation temperature. When all of the measured temperature of the plurality of antenna modules is higher than the threshold module operation temperature, the UE may determine that there is no, for example, available antenna module and switch the operation mode form the switching mode 1001 or the module partial usage mode 1003 to the module termination mode.

According to an embodiment of the disclosure, the antenna module termination mode may indicate a mode for terminating communication using the second frequency band. For example, when the measured temperature of at least one of the plurality of antenna modules is lower than the threshold module operation temperature, the UE may determine that there is an available module. The second frequency band may include, for example, FR2 for NR communication as defined above.

In operation 1103 according to an embodiment, the UE may determine a threshold RSRP (for example, the second threshold value in the description of FIG. 10) on the basis of an RSRP for the serving antenna module and/or data throughput (TPUT). The UE may determine TPUT for downlink service throughput expected at a time point at which the RSRP of the serving antenna module is lowered and thus a block error rate (BLER) becomes lower than a predefined reference value. The UE may determine a threshold RSRP by comparing the RSRP of the serving antenna module with one of a plurality of RSRP levels indicating the size of TPUT difference.

For example, when the UE identifies that the RSRP measured through the serving antenna module corresponds to an RSRP level having large TPUT difference, the UE may configure the threshold RSRP as a value smaller than the current threshold RSRP or 0. In another example, when the UE identifies that the RSRP measured through the serving antenna module corresponds to an RSRP level having large TPUT difference, the UE may configure the threshold RSRP as a value larger than the previous threshold RSRP.

In operation 1105 according to an embodiment, the UE may determine a module switching operation on the basis of the threshold RSRP and the threshold data throughput. The UE may identify whether the difference between the RSRP of the serving antenna module and the RSRP of the target antenna module is smaller than the threshold RSRP. The UE may identify whether the uplink throughput is smaller than the threshold data throughput. When the difference between the RSRP of the serving antenna module and the RSRP of the target antenna module is smaller than the threshold RSRP and when the uplink throughput is smaller than the threshold data throughput, the UE may determine a switching operation to change the serving antenna module. When the difference between the RSRP of the serving antenna module and the RSRP of the target antenna module is larger than the threshold RSRP or when the uplink throughput is larger than the threshold data throughput, the UE may determine a switching operation to change the serving antenna module.

In operation 1107 according to an embodiment, the UE may perform communication on the basis of the determined module switching operation. The UE may perform communication through at least one serving antenna module changed according to the antenna module switching operation.

Figure 12:
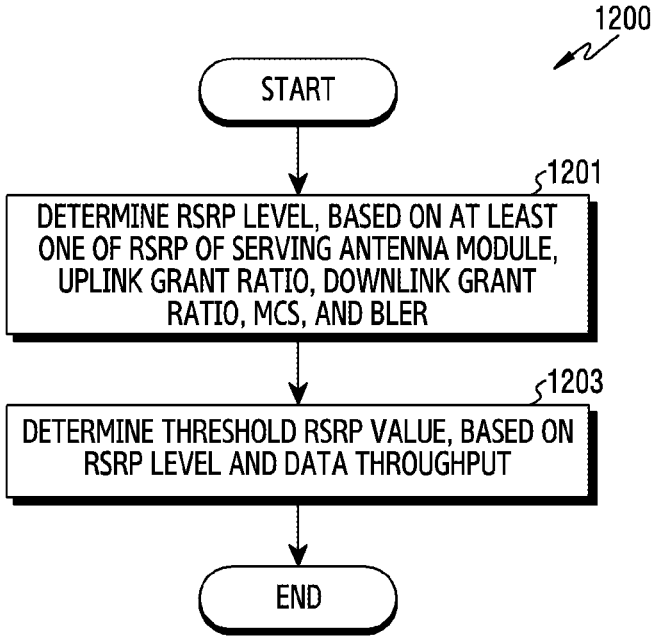
FIG. 12 is a flowchart illustrating an example method of operating a UE to determine threshold reference signal received power in a wireless communication system according to various embodiments.

FIG. 12 is a flowchart 1200 illustrating an example method of operating a UE (for example, the first UE 120 or the second UE 130 of FIG. 1 or the electronic device 501 of FIG. 5) for determining threshold reference signal reception power in a wireless communication system according to various embodiments.

Referring to FIG. 12, in operation 1201 according to an embodiment, the UE may determine an RSRP level on the basis of at least one of an RSRP of the serving antenna module (for example, the first RF module 701, the second RF module 703, or the third RF module 705 of FIG. 7), an uplink grant ratio, a downlink grant ratio, an MCS, and a BLER. The UE may identify an RSRP level corresponding to the RSRP measured by the serving antenna module according to a preset reference. For example, when the RSRP measured by the serving RF module is changed, at least one of the uplink grant ratio, the downlink grant ratio, the MCS, the SINR, and the BLER may be changed and the TPUT performance difference for each RSRP level may be different according to reduction in the RSRP measured by the UE. The RSRP level corresponding to the size of the TPUT difference may be configured on the basis of a degree of influence of the RSRP, the uplink grant ratio, the downlink grant ratio, the MCS, and the BLER on the TPUT. The UE may determine the corresponding RSRP level on the basis of at least one of the RSRP through the serving antenna module, the uplink grant ratio, the downlink grant ratio, the MCS, and the BLER.

In operation 1203 according to an embodiment, the UE may determine a threshold RSRP value (for example, the second threshold value in the description of FIG. 10) on the basis of the RSRP level and the data throughput. For example, when the UE identifies that the RSRP measured through the serving antenna module corresponds to an RSRP level having large TPUT difference, the UE may configure the threshold RSRP as a value smaller than the current threshold RSRP or as 0. In another example, when the UE identifies that the RSRP measured through the serving antenna module corresponds to an RSRP level having small TPUT difference, the UE may configure the threshold RSRP as a value larger than the previous threshold RSRP. A degree of the TPUT difference used to determine the RSRP level can be changed according to a user setting, and accordingly, the RSRP level can be changed according to the setting. The threshold RSRP may be additionally compensated according to a downlink scheduling rate received by the UE.

Figure 13:
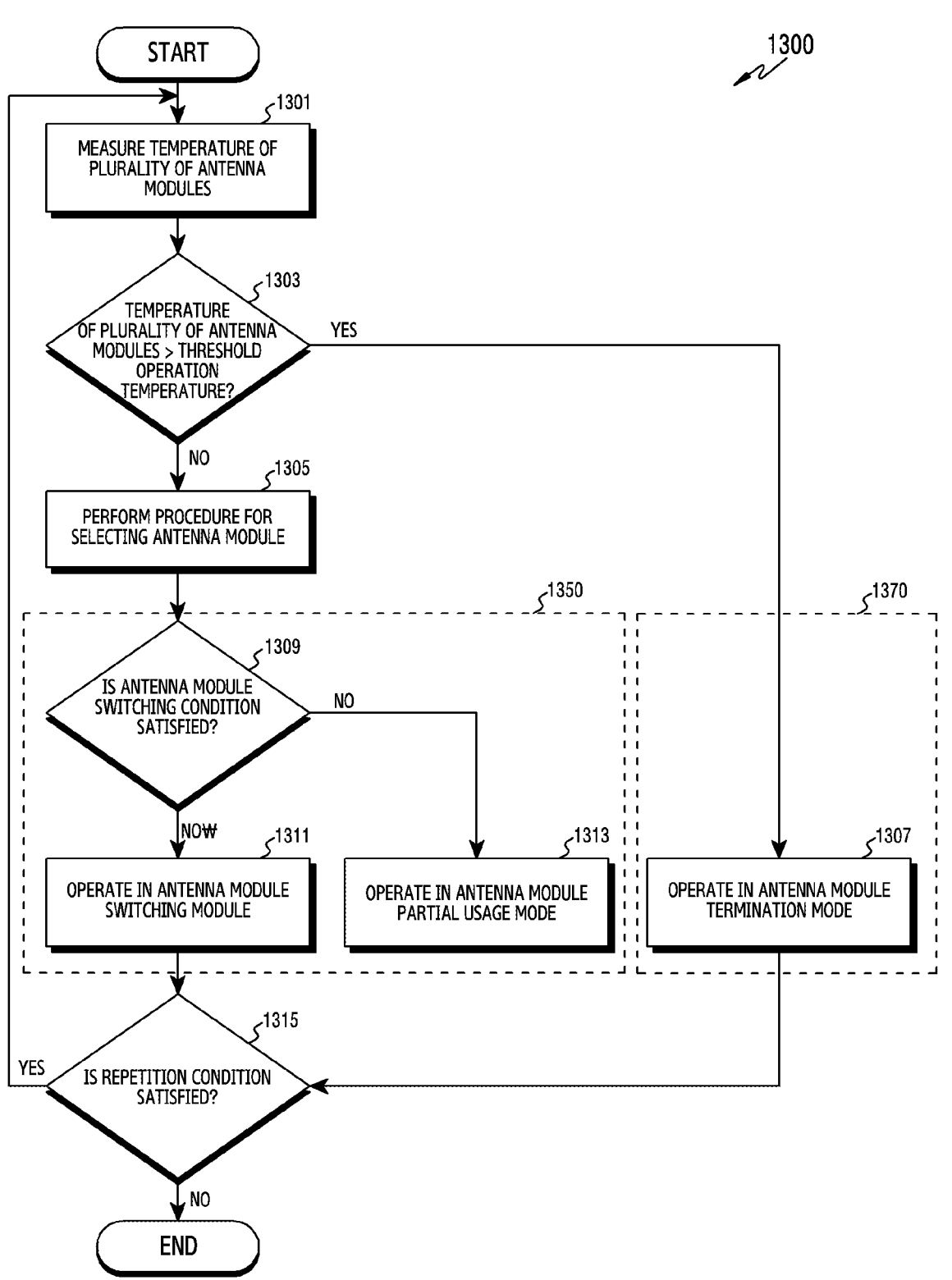
FIG. 13 is a flowchart illustrating an example method of operating a UE in an RF module control system according to various embodiments.

FIG. 13 is a flowchart 1300 illustrating an example method of operating a UE (for example, the first UE 120 or the second UR 130 of FIG. 1 or the electronic device 501 of FIG. 5) in an RF module control system according to various embodiments.

Referring to FIG. 13, in operation 1301 according to an embodiment, the UE may measure temperature of a plurality of antenna modules (for example, the first RF module 701, the second RF module 703, or the third RF module 705 of FIG. 7). The UE may measure temperature of a plurality of antenna modules included therein in order to identify whether the plurality of antenna modules are activated.

In operation 1303 according to an embodiment, the UE may identify whether the temperature of the plurality of antenna modules is greater than or equal to threshold module operation temperature (for example, the first threshold value in the description of FIG. 10). When at least one of the measured temperature of the plurality of antenna modules is lower than the threshold module operation temperature (No), the UE may determine that there is an available module. In this case, the UE may proceed to operation 1305 according to an embodiment and perform a procedure for changing, replacing, or selecting the serving antenna module (hereinafter, referred to as a 'serving antenna module configuration procedure'). When all of the measured temperature of the plurality of antenna modules is higher than the threshold module operation temperature (Yes), the UE may determine that there is no available antenna module and may be initialized or switch the operation mode to the antenna module termination mode (for example, the module termination mode 1005 of FIG. 10).

In operation 1305 according to an embodiment, the UE may perform a procedure for selecting, changing, or replacing the serving antenna module (or a used frequency band). The serving antenna module configuration procedure may include at least some of a procedure for changing the serving antenna module being used by the UE to a target antenna module and a procedure for changing some of data transmission using the serving antenna module being used by the UE to transmission using the target antenna module (or a target frequency band).

In operation 1307 according to an embodiment, the UE may operate in the module termination mode. The module termination mode may include, for example, an operation of terminating communication using the second frequency band (for example, FR2 in the description of FIG. 10) and changing a frequency to perform communication using the first frequency band (for example, FR1 in the description of FIG. 10). The first frequency band may be designated to, for example, an LTE frequency band among the LTE frequency band and an NR frequency band included in FR1.

In operation 1309 according to an embodiment, the UE may identify whether antenna module switching conditions (for example, threshold conditions (2), (3), and/or (4) defined in the description of FIG. 10) are satisfied. The UE may determine a type of the operation mode on the basis of, for example, the threshold RSRP (for example, the second threshold value in the description of FIG. 10) and the threshold data throughput. When it is identified that the antenna module switching conditions are satisfied (Yes), the UE may proceed to operation 1311 according to an embodiment and perform an operation according to the module switching mode (For example, the module switching mode 1001 of FIG. 10). When it is identified that the antenna module switching conditions are not satisfied, the UE may proceed to operation 1313 according to an embodiment and perform an operation according to the module partial usage mode (for example, the module partial usage mode 1003 of FIG. 10).

In operation 1311 according to an embodiment, the UE may operate in the module switching mode. A process for the operation in the module switching mode may include, for example, an operation for changing the serving antenna module being used by the UE to a target antenna module.

In operation 1313 according to an embodiment, the UE may operate in the module partial usage mode. A process for the operation in the module partial usage mode may include, for example, an operation for changing some of data transmission or reception using the serving antenna module being used by the UE to transmission using the target antenna module (or a different frequency band). The UE may change a transmission path of uplink data to transmit the uplink data through switching from the second frequency band to the first frequency band. The first frequency band may be designated to, for example, an LTE frequency band among the LTE frequency band and an NR frequency band included in FR1.

In operation 1315 according to an embodiment, the UE may identify whether a repetition condition is satisfied. In case that the repetition condition is satisfied (Yes), the UE may perform the operation 1301. For example, the repetition condition includes various conditions that trigger the UE to measure temperature of plurality of antenna modules.

For example, the operation 1315 may be omitted. That is, the UE may perform the operation 1311, 1313, or 1307, and the UE may not perform the operation 1315.

Figure 14:
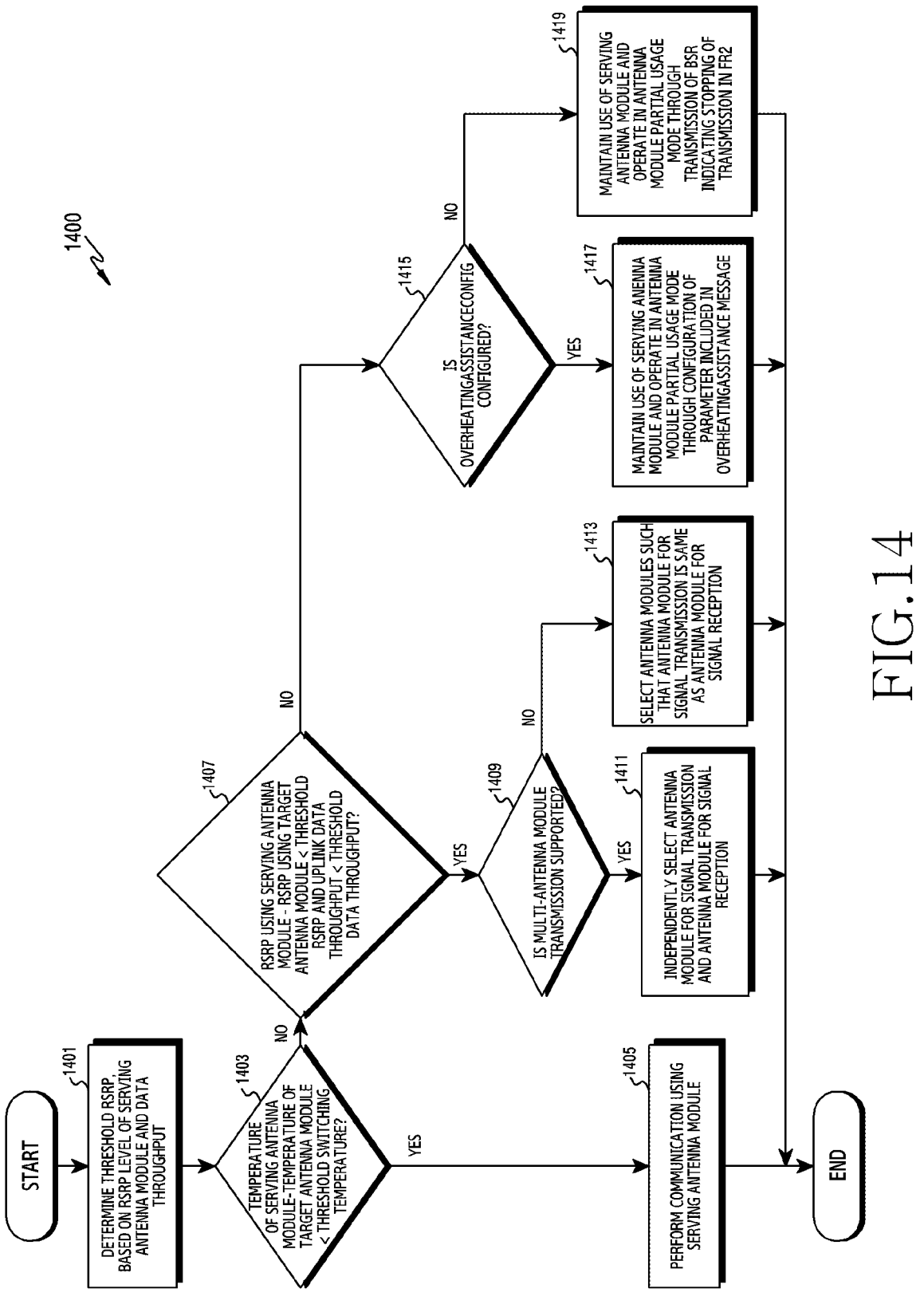
FIG. 14 is a flowchart illustrating an example method of operating a UE based on module switching in an RF module control system according to various embodiments.
Figure 15:
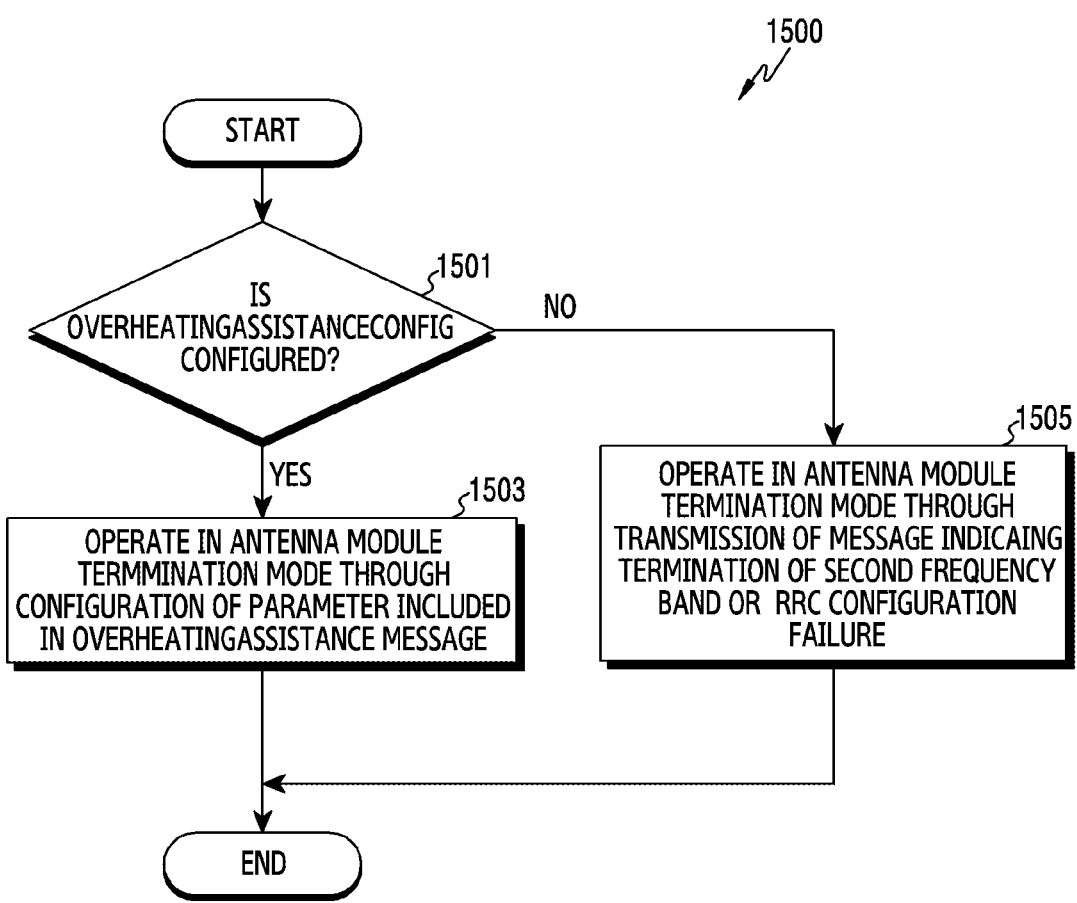
FIG. 15 is a flowchart illustrating an example method of operating a UE based on module stopping in an RF module control system according to various embodiments.

The operation of the UE for operation 1350 according to an embodiment may be described as an operation of FIG. 14, and the operation of the UE for operation 1370 according to an embodiment may be described as an operation of FIG. 15.

FIG. 14 is a flowchart 1400 illustrating an example method of operating a UE (for example, the first UE 120 or the second UE 130 of FIG. 1 or the electronic device 501 of FIG. 5) based on module switching in an RF module control system according to various embodiments.

Referring to FIG. 14, in operation 1401 according to an embodiment, the UE may determine a threshold RSRP (for example, the second threshold value in the description of FIG. 10) on the basis of an RSRP level of the serving antenna module and data throughput. The UE may determine the RSRP level on the basis of at least one of an RSRP of the serving antenna module, an uplink grant ratio, a downlink grant ratio, an MCS, and a BLER. The UE may identify an RSRP level corresponding to the RSRP measured by the serving antenna module according to a preset reference. The UE may determine a threshold RSRP value on the basis of the identified RSRP level and the data throughput.

In operation 1403 according to an embodiment, the UE may identify whether difference between temperature of the serving antenna module and temperature of the target antenna module is less than threshold switching temperature (for example, the third threshold value in the description of FIG. 10). When it is identified that the difference between the temperature of the serving antenna module and the temperature of the target antenna module is less than the threshold switching temperature (Yes), the UE may proceed to operation 1405 according to an embodiment and perform communication using the serving antenna module. When it is identified that the difference between the temperature of the serving antenna module and the temperature of the target antenna module is higher than the threshold switching temperature (No), the UE may proceed to operation 1407 according to an embodiment and determine a module switching operation on the basis of the threshold RSRP and threshold data throughput.

In operation 1407 according to an embodiment, the UE may identify whether the difference between the RSRP using the serving antenna module and the RSRP using the target antenna module is less than the threshold RSRP. The UE may identify whether uplink data throughput is smaller than threshold data throughput. When the difference between the RSRP of the serving antenna module and the RSRP of the target antenna module is less than the threshold RSRP and when uplink throughput is less than threshold data throughput (Yes), the UE may proceed to operation 1409 according to an embodiment and identify whether multi-antenna module transmission is supported. When the difference between the RSRP of the serving antenna module and the RSRP of the target antenna module is greater than or equal to the threshold RSRP and when the uplink data throughput is greater than the threshold data throughput (No), the UE may proceed to operation 1415 according to an embodiment and identify whether OverheatingassistanceConfig is configured.

In operation 1409 according to an embodiment, the UE may identify whether multi-antenna module transmission is supported. When it is identified that the multi-antenna module transmission is supported (Yes), the UE may proceed to operation 1411 according to an embodiment and independently select an antenna module for signal transmission and an antenna module for signal reception. When it is identified that the multi-antenna module transmission is not supported (No), the UE may proceed to operation 1413 and select antenna modules such that the antenna module for signal transmission and the same as the antenna module for signal reception are the same as each other.

In operation 1415 according to an embodiment, the UE may identify whether OverheatingassistanceConfig is configured. When the UE is configured to use OverheatingAssistance within a UEAssistanceInformation message defined in TS 36.331 that is the 3GPP standard document (Yes), the UE may proceed to operation 1417 according to an embodiment, maintain the use of the serving antenna module, and operate in the antenna module partial usage mode through a configuration of a parameter included in the Overheatingassistance message. The UE may control a parameter of ReducedMaxBW-FR2 included in the OverheatingAsstance message. The UE may transmit information indicating that transmission is not possible in the second frequency band to the network through a method of configuring reducedBW-FR2-UL included in reducedMaxBW-FR2 as mhz0 and configuring reducedBW-FR2-DL, reducedBW-FR1-DL, and reducedBW-FR1-UL as a value which is not 0.

According to an embodiment of the disclosure, when the UE is not configured to use OverheatingAssistance within the UEAssistanceInformation message (No), the UE may proceed to operation 1419 and operate in the module partial usage mode through transmission of a BSR indicating the maintenance of the use of the serving antenna module and the stop of transmission in FR2. The UE may perform control to reduce transmission in the second frequency band by transmitting a BSR concentrated in another path. The UE may upload the BSR to LTE from an uplink split bearer state and, if the first frequency band and the second frequency band are being simultaneously used, transmit a BSR corresponding to the first frequency band.

FIG. 15 is a flowchart 1500 illustrating an example method of operating a UE (for example, the first UE 120 or the second UE 130 of FIG. 1 or the electronic device 501 of FIG. 5) based on the stop of the module in an RF module control system according to various embodiments.

Referring to FIG. 15, in operation 1501 according to an embodiment, the UE may identify whether OverheatingassistanceConfig is configured. When the UE is configured to use OverheatingAssistance within a UEAssistanceInformation message (Yes), the UE may proceed to operation 1503 according to an embodiment and operate in the module termination mode (for example, the module termination mode 1005 of FIG. 10) through a configuration of a parameter included in the Overheatingassistance message. When the UE is configured to use OverheatingAssistance within the UEAssistanceInformation message, the UE may control a parameter of ReducedMaxBW-FR2 included in the OverheatingAsstance message. The UE may transmit information indicating that transmission is not possible in the second frequency band to the network through a method of configuring reducedBW-FR1-DL and reducedBW-FR2-UL included in reducedMaxBW-FR2 as mhz0 and configuring reducedBW-FR1-DL and reducedBW-FR1-UL as a value which is not 0 according thereto.

According to an embodiment of the disclosure, when the UE is configured to not use OverheatingAssistance within the UEAssistanceInformation message (No), the UE may proceed to operation 1505 according to an embodiment and operate in the module termination mode through transmission of a message indicating termination of the use of the second frequency band or an RRC message indicating RRC configuration failure. When the UE is not configured to use OverheatingAssistance within the UEAssistanceInformation message, the UE may transmit an A2 NR measure report or an scgFailureInformation message to the network. For example, in the case in which ReportConfig for an A2 event indicating termination of the band allocated when the UE receives allocation of the second frequency band is activated, the UE may transfer the A2 event to the network as a message for stopping the use of the second frequency band. In another example, when ReportConfig for the A2 event is not activated in the UE, the UE may randomly transfer the scgFailureInformation message to the network to stop the NR use.

Figure 16:
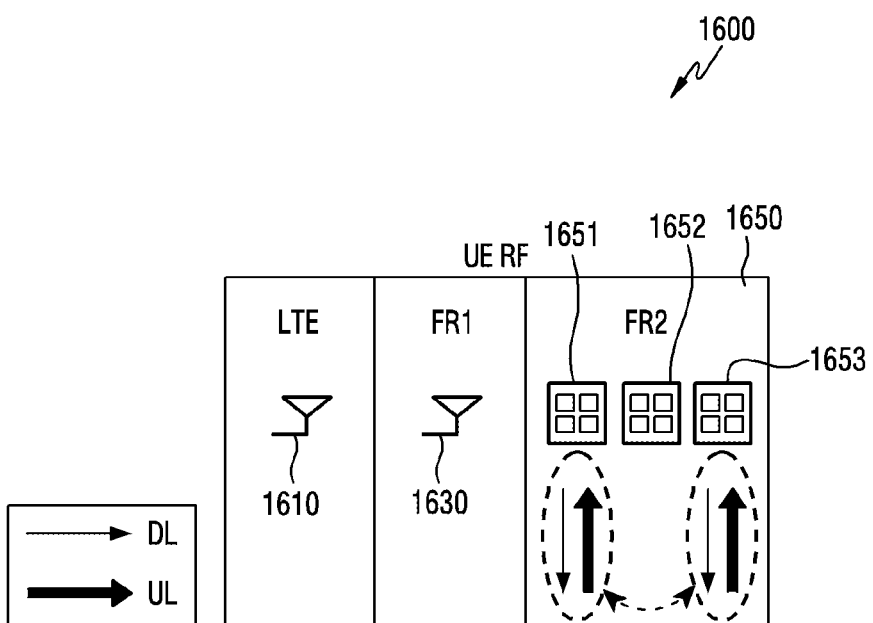
FIG. 16 is a diagram illustrating a module switching mode in a wireless communication system according to various embodiments.

FIG. 16 is a diagram illustrating an example operation of an electronic device (for example, the first UE 120 or the second UE 130 of FIG. 1 or the electronic device 501 of FIG. 5) in a module switching mode 1600 (for example, the module switching mode 1001 of FIG. 10) according to various embodiments.

Referring to FIG. 16, the electronic device according to an embodiment may include a first antenna 1610 (for example, the first antenna module 642 of FIG. 6) operating in an LTE frequency band included in a first frequency band (for example, FR1 (sub-6 band) in the description of FIG. 10), a second antenna 1630 (for example, the second antenna module 644 of FIG. 6) operating an NR frequency band included in the first frequency band, and a plurality of RF modules 1650, including 1651, 1652, 1653 (for example, the third antenna module 646 of FIG. 6) operating in a second frequency band (for example, FR2 in the description of FIG. 10). A thick arrow indicates a transmission path, and a thin arrow indicates a reception path.

According to an embodiment, the first frequency band may be different from the second frequency band. The first frequency band is, for example, a partial frequency band for LTE and/or NR communication in a frequency band defined in the 5G NR standard and may include, for example, 410 MHz to 6 GHz (or 7.125 GHz). The second frequency band is, for example, a partial frequency band for NR communication in a frequency band defined in the 5G NR standard and may include an mmWave band (for example, 24.25 GHz to 52.6 GHz).

The module switching mode 1600 according to an embodiment may indicate a mode in which a similar electric field is guaranteed and a plurality of antenna modules (for example, the first RF module 701, the second RF module 703, and the third RF module 705 of FIG. 7) in an available temperature state are distributively used in transmission and reception of the electronic device. The module switching mode may indicate a mode in which, for example, the RF modules 1651 to 1653 operating the second frequency band are alternately used. The electronic device may perform uplink and downlink transmission and reception in the second frequency band through, for example, the serving RF module 1651. The electronic device may identify a target RF module 1653 to reduce heat concentration in a serving RF module 1651 and change the identified target RF module 1653 to the serving RF module. In this case, the electronic device may perform communication for transmitting and receiving a signal through a new serving RF module 1653.

According to an embodiment of the disclosure, as the electronic device uses the serving RF module 1651, temperature of the serving RF module 1651 may increase. For the alternate use between antenna modules in the available temperature state, the electronic device may identify at least one switchable candidate RF module on the basis of threshold module operation temperature (for example, the first threshold value in the description of FIG. 10). After at least one candidate RF module is identified, the UE may identify the target RF module 1653 on the basis of threshold switching temperature (for example, the third threshold value in the description of FIG. 10).

According to an embodiment of the disclosure, when the electronic device is not using an uplink-centric service causing a rapid temperature increase in a similar electric field state between modules, the electronic device may change the used module from the serving RF module 1651 to the target RF module 1653 and transmit and receive a signal.

According to an embodiment of the disclosure, when a multi-module operation is possible, the module switching mode of the electronic device may indicate a mode for module switching limited to a specific path in the uplink and the downlink.

According to an embodiment of the disclosure, the module switching operation may include a procedure in which the module is activated and operated during the time of at least one time to interval (TTI), occasion, slot, or symbol. At this time, when the module switching operation is performed, some delay may occur (for example, several us or ms). For example, a UE operating by time division duplex (TDD) may perform control to make downlink (or uplink) path switching during an uplink (or downlink) transmission interval.

According to an embodiment of the disclosure, a threshold RSRP (for example, the second threshold value in the description of FIG. 10) for identifying the similar electric field between modules may be variably configured according to an electric field of the UE and a state of downlink service traffic.

Figure 17:
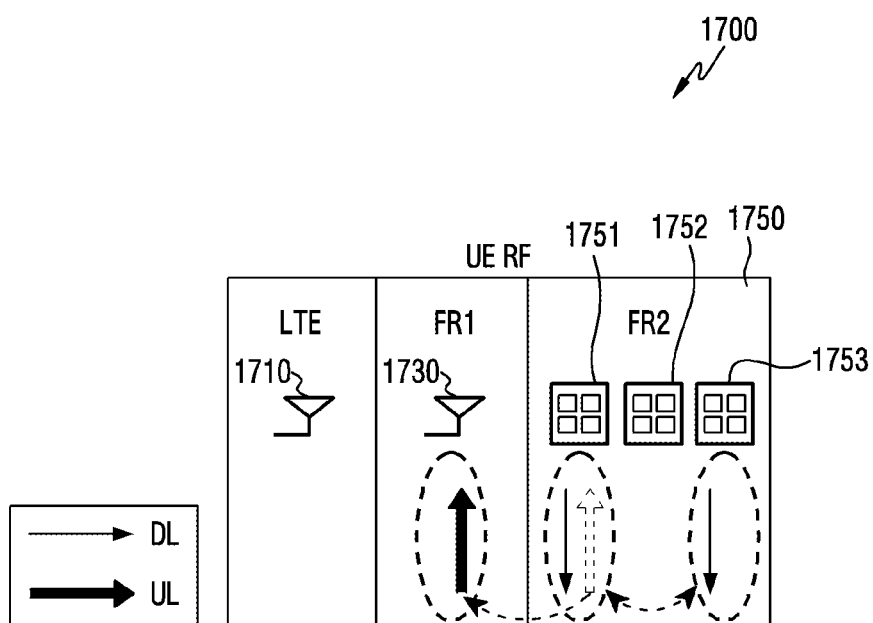
FIG. 17 is a diagram illustrating a module partial usage mode in a wireless communication system according to various embodiments.

FIG. 17 is a diagram illustrating example operation of an electronic device (for example, the first UE 120 or the second UE 130 of FIG. 1 or the electronic device 501 of FIG. 5) in a module partial usage mode 1700 (for example, the module partial usage mode 1003 of FIG. 10) according to various embodiments.

Referring to FIG. 17, the electronic device according to an embodiment may include a first antenna 1710 (for example, the first antenna module 642 of FIG. 6) operating in an LTE frequency band included in a first frequency band (for example, FR1 (sub-6 band) in the description of FIG. 10), a second antenna 1730 (for example, the second antenna module 644 of FIG. 6) operating an NR frequency band included in the first frequency band, and a plurality of RF modules 1750, including modules 1751, 1752, 1753 (for example, the third antenna module 646 of FIG. 6) operating in a second frequency band (for example, FR2 in the description of FIG. 10). A thick arrow indicates a transmission path and a thin arrow indicates a reception path. The first frequency band may be different from the second frequency band. The first frequency band is, for example, a partial frequency band for LTE and/or NR communication (for example, FR1) in a frequency band defined in the 5G NR standard and may include, for example, 410 MHz to 6 GHz (or 7.125 GHz). The second frequency band (FR1) is, for example, a partial frequency band for NR communication in a frequency band defined in the 5G NR standard and may include an mmWave band (for example, 24.25 GHz to 52.6 GHz).

According to an embodiment, the module partial usage mode 1700 may indicate a mode of maintaining a frequency band to perform a reception operation and changing a frequency band to perform a transmission operation. When the module partial usage mode 1700 is applied, the electronic device may, for example, maintain to perform the reception operation in the second frequency band and control the performance of the transmission operation in the first frequency band. For example, in the operation of the module partial usage mode 1700, the electronic device may switch the frequency band for the transmission operation from the second frequency band to the first frequency band and maintain the frequency band for the reception band as the second frequency band.

According to an embodiment, the electronic device performing all of the transmission/reception operations through the first RF module 1751 supporting the second frequency band may switch the antenna module to perform the transmission operation to an RF module including the second antenna 1730 transmitting a signal in an NR frequency band included in the first frequency band in order to reduce heating of the first RF module 1751. The electronic device may switch the antenna module to perform the reception operation from the first RF module 1751 to the third RF module 1753. The transmission operation through the second antenna 1730 may be performed for a data channel. The data channel is an uplink control information (UCI) type and may be determined on the basis of at least one of a scheduling request, hybrid acknowledge (HARQ), ACK/NACK, a channel quality indicator (CQI), a bit size, and a channel state information (CSI) type.

According to an embodiment of the disclosure, the electronic device may identify whether an uplink-centric service is used on the basis of at least one of uplink resources, an MCS, a BLER, a buffer status report (BSR), and threshold TPUT including an uplink TPUT history in the module switching mode. When it is identified that the uplink TPUT is larger than the threshold TPUT by the uplink-centric service, the electronic device may determine to use the module partial usage mode.

According to an embodiment of the disclosure, when it is determined to use the module partial usage mode, the electronic device may configure a parameter included in a request message transmitted to the network in order to switch the frequency band for transmission from the second frequency band to the NR frequency band included in the first frequency band. The electronic device may configure a parameter of reducedMaxBW-FR2 included in the OverheatingAssitance message. When a split bearer is configured, the electronic device may make a buffer status report (BSR) concentrated in the first frequency band.

It has been described above that the electronic device to which the module partial usage mode is applied may switch the frequency band for transmission from the second frequency band to the NR frequency band included in the first frequency band. However, when the electronic device can support communication in the LTE network, the frequency band for transmission may switch from the second frequency band to the LTE frequency band included in the first frequency band.

Figure 18:
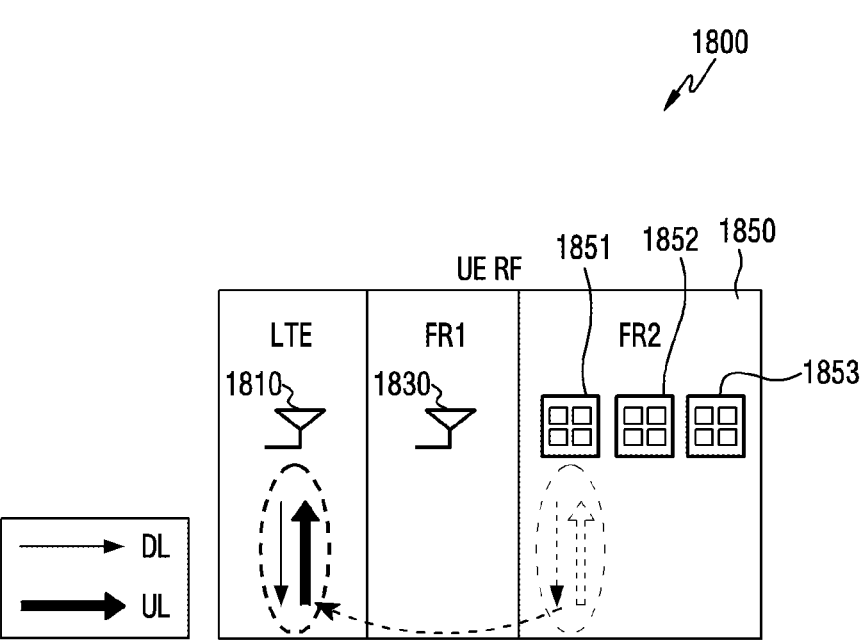
FIG. 18 is a diagram illustrating a module termination mode in a wireless communication system according to various embodiments.

FIG. 18 is a diagram illustrating example operation of an electronic device (for example, the first UE 120 or the second UE 130 of FIG. 1 or the electronic device 501 of FIG. 5) in a module termination mode 1800 (for example, the module termination mode 1005 of FIG. 10) according to various embodiments.

Referring to FIG. 18, the electronic device according to an embodiment may include a first antenna 1810 (for example, the first antenna module 642 of FIG. 6) operating in an LTE frequency band included in a first frequency band (for example, the FR1 (sub-6) band in the description of FIG. 10), a second antenna 1830 (for example, the second antenna module 644 of FIG. 6) operating in an NR frequency band included in the first frequency band, and a plurality of antenna modules 1851, 1852, 1853 (for example, the third antenna module 646 of FIG. 6) operating in a second frequency band 1850 (for example, FR2 in the description of FIG. 10). A thick arrow indicates a transmission path and a thin arrow indicates a reception path. The first frequency band may be different from, for example, the second frequency band 1850. The first frequency band is, for example, a partial frequency band (FR1) for LTE and/or NR communication in a frequency band (FR) defined in the 5G NR standard and may include, for example, 410 MHz to 6 GHz (or 7.125 GHz). The second frequency band is, for example, a partial frequency band (FR2) for NR communication in a frequency band (FR) defined in the 5G NR standard and may include a mmWave band (for example, 24.25 GHz to 52.6 GHz).

According to an embodiment, the module termination mode 1800 may indicate a mode of switching a frequency band to perform a reception operation and a transmission operation. When the module termination mode 1800 is applied, the electronic device may terminate communication in the second frequency band and make control to perform fallback for communication using the LTE frequency band included in the first frequency band if it is identified that, for example, it is difficult to maintain the serving RF module in the second frequency band. In the module termination mode 1800, the electronic device may perform an operation of switching a transmission and reception path from the second frequency band to the first frequency band. The electronic device may perform the transmission/reception operation in the second frequency band through the serving RF module 1851. When all RF modules 1851 to 1853 supporting communication in the second frequency band cannot be maintained, the electronic device may switch to the LTW frequency band included in the first frequency band and stop the use of the second frequency band.

In this case, the electronic device may make a request for stopping the transmission/reception operation in the second frequency band to the NR network.

According to an embodiment of the disclosure, in order to make the request for stopping the use of the second frequency band to the NR network, the electronic device may configure a parameter included in a first request message to be transmitted to the NR network. The electronic device may configure a parameter of reducedMaxBW-FR2 included in the OverheatingAssitance message. The electronic device may make a request for controlling a bandwidth (BW) by combining ReducedMaxBW-FR1 and ReducedMaxBW-FR2 included in the OverheatingAssistance message. The electronic device may make a request for stopping the use of the second frequency band (FR2) by configuring reducedBW-FR2-DL and reducedBW-FR2-UL included in reducedMaxBW-FR2 as mhz0 and configuring reducedBW-FR1-DL and reducedBW-FR1-UL as a value which is not 0.

According to an embodiment of the disclosure, the electronic device may transmit a second request message to the NR network in order to make a request for stopping the sue of the second frequency band. The electronic device may transmit, for example, an A2 NR measure report or an scgFailureInformation message to the NR network. For example, in the case in which ReportConfig for an A2 event indicating termination of the band allocated when the electronic device receives allocation of the second frequency band is activated, the electronic device may transfer the A2 event to the NR network as a message for stopping the use of the second frequency band. In another example, when ReportConfig for the A2 event is not activated, the electronic device may randomly transfer the scgFailureInformation message to the NR network to stop the NR use. In another example, when a CSI report message of the second frequency band is transmitted, the electronic device may report a measurement value lower than a measured value. The electronic device may terminate the use of the second frequency band through a method of not transmitting a B1 NR Measure Report message in the second frequency band.

According to an embodiment, when the electronic device supports CA in the NR network, the electronic device in which the module termination mode is configured may switch the frequency band for the transmission/reception operation from the second frequency band 1850 to the NR frequency band included in the first frequency band. In this case, the electronic device may switch the serving RF module from an RF module (for example, the first RF module 1851 of FIG. 18) transmitting/receiving a signal in the second frequency band to an RF module including an antenna (for example, the second antenna 1830 of FIG. 18) transmitting/receiving a signal in the NR frequency band included in the first frequency band.

Figure 19:
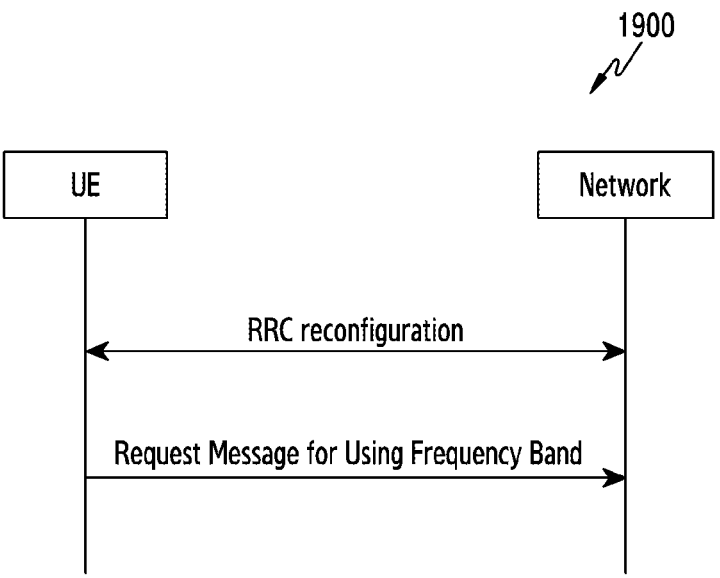
FIG. 19 is a signal flow diagram illustrating an example method of operating a UE and a network for message signaling making a request for switching a module in a wireless communication system according to various embodiments.

FIG. 19 is a signal flow diagram illustrating an example method 1900 of operating message signaling making a request for switching a module in a wireless communication system by a UE (for example, the first UE 120 or the second UE 130 of FIG. 1 or the electronic device 501 of FIG. 5) and a network (for example, the BS 110 of FIG. 1) according to various embodiments.

Referring to FIG. 19, the UE according to an embodiment may establish a radio resource control (RRC) connection with the network. The UE may transmit a request message for the use of a first frequency band (for example, the FR1 (sub-6) band in the description of FIG. 10) and a second frequency band (for example, FR2 in the description of FIG. 10) to the network after the RRC connection. The first frequency band may be different from the second frequency band. The first frequency band (for example, FR1) is, for example, a partial frequency band for LTE and/or NR communication in a frequency band defined in the 5G NR standard and may include, for example, 410 MHz to 6 GHz (or 7.125 GHz). The second frequency band (FR2) is, for example, a partial frequency band for NR communication in a frequency band defined in the 5G NR standard and may include a mmWave band (for example, 24.25 GHz to 52.6 GHz).

According to an embodiment of the disclosure, when OverheatingAssitance is configured as OtherConfig in the network, the UE may transmit UEAssistanceInformation to the network. The UEAssistanceInformation may include an OverheatingAssistance field, and the OverheatingAssistance field may include a parameter for changing an uplink path of the first frequency band and the second frequency band. The UE may transfer at least one parameter for controlling its own heating to the network.

[Table 1] below shows that the OverheatingAssitance message may include educedMaxCCs, reducedMaxBW, and reducedMaxMIMO.

TABLE 1

| OverheatingAssistance ::= | SEQUENCE { |
| reducedMaxCCs | SEQUENCE { |
| reducedCCsDL | INTEGER (0..31), |
| reducedCCsUL | INTEGER (0..31) |
| } OPTIONAL, | |
| reducedMaxBW-FR1 | SEQUENCE { |
| reducedBW-FR1-DL | |
| ReducedAggregatedBandwidth, | |
| reducedBW-FR1-UL | |
| ReducedAggregatedBandwidth | |
| } OPTIONAL, | |
| reducedMaxBW-FR2 | SEQUENCE { |
| reducedBW-FR2-DL | |
| ReducedAggregatedBandwidth, | |
| reducedBW-FR2-UL | |
| ReducedAggregatedBandwidth | |
| } OPTIONAL, | |
| reducedMaxMIMO-LayersFR1 | SEQUENCE { |
| reducedMIMO-LayersFR1-DL | MIMO-LayersDL, |
| reducedMIMO-LayersFR1-UL | MIMO-LayersUL |
| } OPTIONAL, | |

TABLE 1-continued

| reducedMaxMIMO-LayersFR2 | SEQUENCE { |
| reducedMIMO-LayersFR2-DL | MIMO-LayersDL, |
| reducedMIMO-LayersFR2-UL | MIMO-LayersUL |
| } OPTIONAL | |

In [Table 1] above, the parameter of reducedMaxBW-FR2 may include reducedBW-FR2-UL and reducedBW-FR2-DL. According to an embodiment, the UE may inform the network whether uplink resources cannot be used in the FR2 band by configuring reducedBW-FR2-UL as 0 MHz. The UE may make a request for changing the uplink path and the NR use to the network on the basis of a method of changing a combination of configurations of parameters included in reducedMaxBW.

FIG. 20 is a diagram illustrating an example 2000 of a module switching mode of an electronic device (for example, the electronic device 501 of FIG. 5) according to various embodiments. FIG. 20 illustrates a method of operating module switching 2010 in a reception environment and module switching 2050 in a transmission environment by an electronic device (for example, the first UE 120 or the second UE 130 of FIG. 1 or the electronic device 501 of FIG. 5).

Referring to FIG. 20, in the case of the module switching 2010 in the reception environment, the electronic device may include a serving RF module 2001, a first target RF module 2003, and a second target RF module 2005.

According to an embodiment of the disclosure, the electronic device may compare temperature of the serving RF module 2001, the first target RF module 2003, and the second target RF module 2005 with threshold module operation temperature (th_temp_usage) (for example, the first threshold value in the description of FIG. 10). When it is identified that the temperature of at least one of the serving RF module 2001, the first target RF module 2003, and the second target RF module 2005 is higher than the threshold module operation temperature, the electronic device may deactivate the RF module having the temperature higher than the threshold module operation temperature. When it is identified that the temperature of at least one of the serving RF module 2001, the first target RF module 2003, and the second target RF module 2005 is lower than the threshold module operation temperature, the electronic device may identify that at least one RF module having the temperature lower than the threshold module operation temperature is RF modules for module switching.

According to an embodiment of the disclosure, the electronic device may compare the temperature difference between the serving RF module and at least one target RF module with threshold switching temperature (th_temp_switching) (for example, the third threshold value in the description of FIG. 10). When the temperature difference between the serving RF module and at least one target RF module is smaller than the threshold switching temperature, the electronic device may maintain communication using the current serving RF module. When the temperature difference between the serving RF module and at least one target RF module is larger than or equal to the threshold switching temperature, the electronic device may perform an RF module switching operation.

According to an embodiment of the disclosure, it is illustrated that temperature of the serving RF module 2001 is 40° C., an RSRP is −82 dBm, temperature of the first target RF module 2003 is 33° C., an RFRP is −85 dBm, temperature of the second target RF module 2005 is 35° C., an RSRP is −85 dBm, threshold switching temperature is 5° C., and a threshold RSRP is 6 dBm. The temperature difference between the serving RF module and the first target RF module is, for example, 7° C., and the temperature difference between the serving RF module and the second target RF module is 5° C. The electronic device may identify that at least one temperature difference between the serving RF module and the target RF modules is larger than the threshold switching temperature and perform switching to at least one module among the target RF modules.

According to an embodiment of the disclosure, the electronic device may determine a threshold th_RSRP (for example, the second threshold value in the description of FIG. 10) on the basis of an RSRP value (−82 dBm) of the serving RF module, a received downlink grant ratio, an MCS, and a BLER value. The electronic device may identify whether to perform module switching by comparing the difference between the RSRP of the serving RF module and the RSRP of the target RF module with the threshold th_RSRP. The difference (3) between the RSRP (−82) of the serving RF module and the RSRP (−85) of the target RF module is smaller than the threshold RSRP (6), and thus the electronic device may perform module switching to at least one of the first target RF module and the second target RF module.

According to an embodiment, in the case of module switching 2050 in the transmission environment, the electronic device may include the serving RF module 2001, the first target RF module 2003, and the second target RF module 2005.

According to an embodiment of the disclosure, the electronic device may compare temperature of the serving RF module 2001, the first target RF module 2003, and the second target RF module 2005 with threshold module operation temperature (th_temp_usage) (for example, the first threshold value in the description of FIG. 10). When it is identified that the temperature of at least one of the serving RF module 2001, the first target RF module 2003, and the second target RF module 2005 is higher than the threshold module operation temperature, the electronic device may deactivate the RF module having temperature higher than the threshold module operation temperature. When it is identified that the temperature of at least one of the serving RF module 2001, the first target RF module 2003, and the second target RF module 2005 is lower than the threshold module operation temperature, the electronic device may identify that at least one RF module having the temperature lower than the threshold module operation temperature is the RF module for module switching.

According to an embodiment of the disclosure, the electronic device may compare the temperature difference between the serving RF module and at least one target RF module with threshold switching temperature (th_temp_switching) (for example, the third threshold value in the description of FIG. 10). When the temperature difference between the serving RF module and at least one target RF module is smaller than the threshold switching temperature, the electronic device may maintain communication using the current serving RF module. When the temperature difference between the serving RF module and at least one target RF module is larger than or equal to the threshold switching temperature, the electronic device may perform an RF module switching operation.

For the temperature of the RF module, a temperature increase due to transmission is relatively larger than a temperature increase due to reception, and thus the RF module having low temperature may be selected from among target RF module candidates satisfying a switching condition.

According to an embodiment of the disclosure, a method of performing module switching from the serving RF module to the target RF module may include a method of switching to another RF module in the state in which only some of antenna elements of the RF module are used and a method of switching to another RF module in the state in which all of the antenna elements are used. The electronic device may perform control to reduce the number of used antenna elements in order to maintain the usage time of the serving RF module by reducing heating. For example, the module switching operation may be performed after one element of the serving RF module is reduced. In another example, when the number of antenna elements of the serving RF module is the same as the preset number of elements, the module switching operation to another RF module may be performed.

Figure 21:
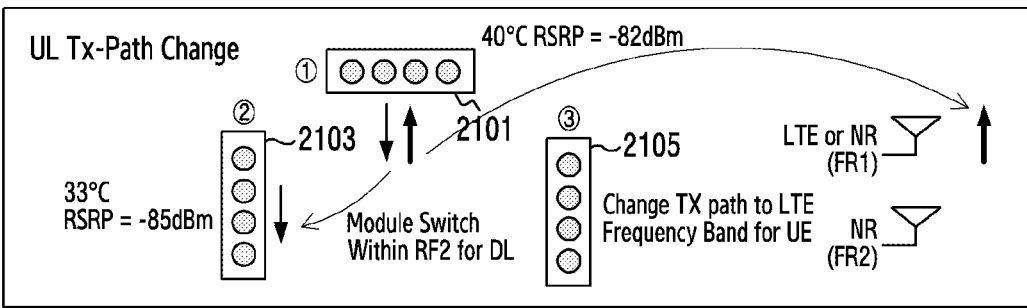
FIG. 21 is a diagram illustrating an example of a module partial usage mode in a wireless communication system according to various embodiments.

FIG. 21 is a diagram illustrating an example 2100 of a module partial usage mode of an electronic device (for example, the electronic device 501 of FIG. 5) according to various embodiment. FIG. 21 illustrates a method of operating a change in a transmission path by an electronic device (for example, the first UE 120 or the second UE 130 of FIG. 1 or the electronic device 501 of FIG. 5).

Referring to FIG. 21, the electronic device according to an embodiment may include a serving RF module 2101, a first target RF module 2103, and a second target RF module 2105. Since temperature of the first target RF module and temperature of the second target RF module are lower than threshold module operation temperature (for example, the first threshold value in the description of FIG. 10), the case in which the first target RF module and the second target RF module are identified as available RF modules is illustrated.

According to an embodiment of the disclosure, when an RSRP measured by the target RF module is smaller than an RSRP measured by the serving RF module and thus the RF module is switched, the electronic device may operate in the module partial usage mode if the performance deterioration of the electronic device is expected. When the electronic device is using an uplink-centric service and an increase in the temperature of the serving RF module is expected due to transmission, the electronic device may operate in the module partial usage mode. The electronic device may perform control to execute a transmission operation in the second frequency band (for example, FR2 in the description of FIG. 10) for transmission and the NR frequency band (NR (FR1)) included in the first frequency band (for example, FR1 in the description of FIG. 10) in order to maintain the use of the serving RF module and reduce the increase in temperature of the RF module.

According to an embodiment of the disclosure, when the electronic device is configured to use OverheatingAssistance within a UEAssistanceInformation message, the electronic device may control a parameter of ReducedMaxBW-FR2 included in the OverheatingAsstance message. The electronic device may transmit information indicating that transmission is not possible in the second frequency band to the NR network through a method of configuring reducedBW-FR2-UL included in reducedMaxBW-FR2 as mhz0 and configuring reducedBW-FR2-DL, reducedBW-FR1-DL, and reducedBW-FR1-UL as a value which is not 0.

According to an embodiment of the disclosure, when the electronic device is not configured to use OverheatingAsistance within a UEAssistanceInformation message, the electronic device may perform control to reduce transmission in the second frequency band by transmitting a BSR concentrated in another path. When the electronic device loads the BSR to the LTE network in an uplink split bearer state and the first frequency band (for example, FR1) and the second frequency band (for example, FR2) are simultaneously used, the electronic device may transmit a BSR corresponding to the first frequency band.

According to an embodiment of the disclosure, it is illustrated that temperature of the serving RF module 2101 is 40° C., an RSRP is −82 dBm, temperature of the first target RF module 2103 is 33° C., an RFRP is −85 dBm, temperature of the second target RF module 2105 is 35° C., an RSRP is −85 dBm, threshold switching temperature is 5° C., and a threshold RSRP is 6 dBm. Since the temperature difference between the serving RF module and the first target RF module is 7° C. and the difference (3) between the RSRP (−82) of the serving RF module and the RSRP (−85) of the first target RF module is smaller than the threshold RSRP (6), the first target RF module 2103 may receive a signal in the second frequency band. However, the transmission path may be changed to perform the transmission operation in the NR frequency band included in the first frequency band rather than in the second frequency band.

FIG. 22 is a diagram illustrating an example 2200 of a module termination mode of an electronic device (for example, the electronic device 501 of FIG. 5) according to various embodiments. FIG. 22 illustrates a method of operating an electronic device (for example, the first UE 120 or the second UE 130 of FIG. 1 or the electronic device 5010 of FIG. 5) to terminate a transmission operation in a second frequency band (for example, FR2 in the description of FIG. 10).

Referring to FIG. 22, the electronic device according to an embodiment may include a serving RF module 2201, a first target RF module 2203, and a second target RF module 2205.

According to an embodiment of the disclosure, the case in which all of the temperature of the serving RF module 2201, the first target RF module 2203, and the second target RF module 2205 are higher than or equal to threshold module operation temperature (for example, the first threshold value in the description of FIG. 10) is illustrated. When it is identified that the temperature of a plurality of RF modules is higher than or equal to the threshold module operation temperature, the electronic device may make a request for stopping communication using the second frequency band to the NR network and control the performance of communication in the LTE frequency band (LTE (FR1)) or the NR frequency band (NR (FR1)) included in the first frequency band (For example, FR1 in the description of FIG. 10). Temperature conditions for the plurality of RF modules may include conditions of surface temperature of the electronic device checked for an LTE fallback operation, temperature of a CP OF the electronic device, and temperature of an AP of the electronic device.

According to an embodiment of the disclosure, when the electronic device is configured to use OverheatingAssistance within a UEAssistanceInformation message, the electronic device may control a parameter of ReducedMaxBW-FR2 included in the OverheatingAsstance message. The electronic device may transmit information indicating that transmission is not possible in the second frequency band to the network through a method of configuring reducedBW-FR2-DL and reducedBW-FR2-UL included in reduced-MaxBW-FR2 as mhz0 and configuring reducedBW-FR1-DL and reducedBW-FR1-UL as a value which is not 0 according thereto.

According to an embodiment of the disclosure, when the UE is not configured to use OverheatingAssistance within the UEAssistanceInformation message, the UE may transmit an A2 NR measure report or an scgFailureInformation message to the NR network. For example, in the case in which ReportConfig for an A2 event indicating termination of the band allocated when the electronic device receives allocation of the second frequency band is activated, the electronic device may transfer the A2 event to the NR network as a message for stopping the use of the second frequency band. In another example, when ReportConfig for the A2 event is not activated, the electronic device may randomly transfer the scgFailureInformation message to the NR network to stop the NR use. In another example, when a CSI report of the second frequency band is transmitted, the electronic device may report a measurement value lower than the measured value. The electronic device may terminate the use of the second frequency band through a method of not transmitting a B1 NR Measure Report message in the second frequency band.

According to an embodiment of the disclosure, the case in which temperature of the serving RF module 2201 is 80° C., an RSRP is −89 dBm, temperature of the first target RF module 2203 is 75° C., an RSRP is −85 dBm, temperature of the second target RF module 2205 is 77° C., and an RSRP is −87 dBm is illustrated. For example, when it is identified that all of the temperature of the serving RF module 2201, the first target RF module 2203, and the second target RF module 2205 are higher than or equal to threshold module operation temperature, the electronic device may identify that there is no available module for module switching. The electronic device may control the performance of the transmission and reception operation in the first frequency band different from the second frequency band.

FIG. 23 is a diagram illustrating an example 2300 of multi-module switching in an electronic device (for example, the electronic device 501 of FIG. 5) according to various embodiments. FIG. 23 illustrates a method of operating an electronic device (for example, the first UE 120 or the second UE 130 of FIG. 1 or the electronic device 501 of FIG. 5) when a plurality of RF modules of millimeter waves are simultaneously used.

Referring to FIG. 23, the electronic device according to an embodiment may include a serving RF module 2301, a first target RF module 2303, and a second target RF module 2305. FIG. 23 shows the case in which the first target RF module 2303 and the second target RF module 2305 are identified as available modules since temperature of the first target RF module 2303 and temperature of the second target RF module 2305 are lower than threshold module operation temperature (for example, the first threshold value in the description of FIG. 10).

According to an embodiment of the disclosure, the case in which the temperature of the serving RF module 2301 is 40° C., an RSRP is −82 dBm, the temperature of the first target RF module 2303 is 31° C., an RSRP is −86 dBm, the temperature of the second target RF module 2305 is 33° C., and an RSRP is −85 dBm is illustrated. The electronic device may perform control to use the second target RF module 2305 having a high RSRP in the reception operation and use the second target RF module 2305 having a low RSRP and lower temperature in the reception operation.

According to an embodiment of the disclosure, when sounding reference signal (SRS) switching is configured, the electronic device may control the performance of switching within one RF module without independently performing the RF module switching operation for transmission and reception. When the SRS switching is configured in the network and the electronic device uses antennas of 1T2R (one transmission antenna and two reception antennas) and 1T4R (one transmission antenna and four reception antennas), the electronic device may deteriorate and transmit an SRS transmitted by an RF module having relatively high temperature among a plurality of modules or omit transmission through the RF module having high temperature. When a plurality of SRSs are simultaneously used like in the case in which 2T4R (the structure including two transmission antennas and four reception antennas) is used, the electronic device may intentionally deteriorate and transmit an SRS transmitted by the RF module or perform control to transmit the SRS through another RF module.

Figure 24:
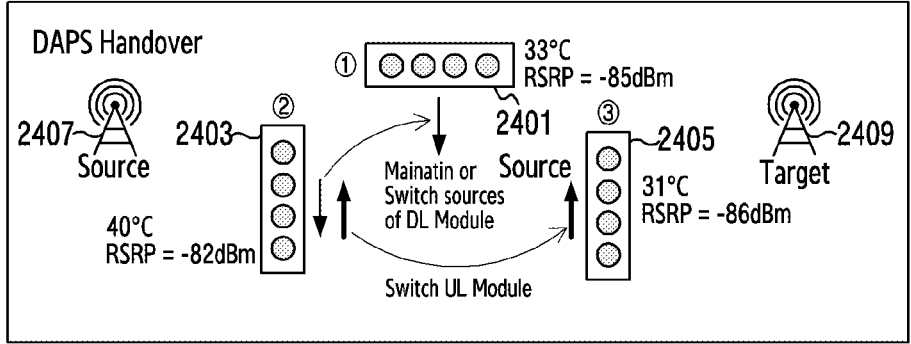
FIG. 24 is a diagram illustrating an example of module switching in an environment in which a dual active protocol stack (DAPS) is supported according to various embodiments.

FIG. 24 is a diagram illustrating an example 2400 of an operation in a module switching mode in an environment in which a dual active protocol stack (DAPS) is supported according to various embodiments. FIG. 24 illustrates a method of operating a UE (for example, the first UE 120 or the second UE 130 of FIG. 1 or the electronic device 501 of FIG. 5) in an environment in which a dual active protocol stack (PS) is supported.

Referring to FIG. 24, the DAPS environment may include a source BS 2407, a target BS 2409, and a UE. The UE may include a first RF module 2401, a second RF module 2403, and a third RF module 2405. In FIG. 24, the UE is a UE capable of performing multi-module communication, and the case in which all of temperature of a first target RF module and temperature of a second target RF module are lower than threshold module operation temperature, the first target RF module and the second target RF module are identified as available modules is illustrated.

According to an embodiment of the disclosure, the case in which the temperature of the first RF module 2401 is 33° C., an RSRP is −85 dBm, the temperature of the second RF module 2403 is 40° C., an RSRP is −82 dBm, the temperature of the third RF module 2405 is 31° C., and an RSRP is −86 dBm is illustrated. In the case of the environment supporting a DAPS handover, the UE may receive data in both a source cell and a target cell during the handover. FIG. 24 illustrates the case in which the DAPS handover is being performed in the state in which the second RF module 2403 of the UE is connected to the source BS 2407 (all of the downlink and the uplink are used). When receiving data, the UE may receive the data through both the second RF module 2403 and the first RF module 2401. When the UE does not receive data, the UE may perform module switching from the second RF module 2403 to the first RF module 2401.

According to an embodiment, as the UE cannot transmit data to both the source cell and the target cell during the handover, the UE may perform module switching to the third RF module 2405 in order to use the target cell for the random access performance. When both the switching to the first RF module 2401 and the switching to the third RF module 2405 are possible, the UE may perform switching to one RF module among the first RF module 2401 or the third RF module 2405. The UE may perform module switching to measure a neighbor cell for the handover.

According to various example embodiments of the disclosure, a method of operating an electronic device (for example, the electronic device 501 of FIG. 5) may include: identifying temperatures of a plurality of antenna modules (for example, the first, second, and third RF modules 701, 703, and 705 of FIG. 7) using a first frequency band, identifying candidate antenna modules in consideration of the plurality of antenna modules, selecting a serving antenna module from among the candidate antenna modules to maintain an available temperature state in which temperatures of the candidate antenna modules are lower than a threshold temperature, and transmitting and/or receiving a signal in the first frequency band through the serving antenna module, wherein the candidate antenna modules include antenna modules configured to support communication performance greater than a threshold level.

According to an example embodiment, the identifying the candidate antenna modules may include including an antenna module of the plurality of antenna modules having a temperature lower than the threshold temperature (th_TEMP_USAGE) in the candidate antenna modules.

According to an example embodiment, when the candidate antenna modules cannot provide communication performance greater than or equal to the threshold level, the method may further include receiving a signal in the first frequency band through the serving antenna module and transmitting a signal in a second frequency band through an antenna module using the second frequency band different from the first frequency band.

According to an example embodiment, in an uplink traffic-centric case in which a transmission operation is dominant over a reception operation, a signal may be transmitted in the second frequency band through an antenna module using the second frequency band different from the first frequency band.

According to an example embodiment, when the candidate antenna modules are not identified from the plurality of antenna modules, the method may include terminating the transmitting and receiving of the signal in the first frequency band and transmitting and receiving a signal in the second frequency band through the antenna module using the second frequency band.

According to an example embodiment, when the candidate antenna modules are not identified from the plurality of antenna modules, the method may further include requesting terminating transmission and reception of the signal in the first frequency band from a BS.

According to an example embodiment, the first frequency band may be 24.25 GHz to 52.6 GHz, and the second frequency band may be one of 410 MHz to 6 GHz or 410 MHz to 7.125 GHz, and the second frequency band may include an LTE frequency band allocated for a long-term evolution (LTE) network and an NR frequency band allocated for a new radio (NR) network.

According to an example embodiment, the antenna module supporting the communication performance greater than or equal to the threshold level may include an antenna module configured to measure a reference signal received power (RSRP) belonging to a specified power range among the plurality of antenna modules, and the specified power range may be configured based on an RSRP measured by the serving antenna module.

According to an example embodiment, the operation of selecting the serving antenna module may include selecting, as a new serving antenna module, a candidate antenna module, of which a temperature is identified to be lower than a temperature of the serving antenna module by a threshold temperature value or higher, from the candidate antenna modules.

According to an example embodiment, the operation of selecting the serving antenna module may include identifying one or a plurality of antenna modules, of which temperatures are identified to lower than a temperature of the serving antenna module by a threshold temperature value or higher, from among the candidate antenna modules, and selecting, as a new antenna module, an antenna module measuring a signal quality better than a signal quality of the serving antenna module from among the one or plurality of identified antenna modules.

According to various example embodiments of the disclosure, an electronic device (for example, the electronic device 501 of FIG. 5) may include: a plurality of first antenna modules including at least one first antenna configured to use a first frequency band, at least one second antenna module including at least one second antenna configured to use a second frequency band different from the first frequency band, and at least one processor (for example, the processor 520 of FIG. 5 or the first communication processor 612 or the second communication processor 614 of FIG. 4) electrically coupled to the plurality of first antenna modules and the at least one second antenna module and configured to: control a transmission operation and a reception operation of signals through the plurality of first antenna modules and the at least one second antenna module, wherein the at least one processor is configured to: identify temperatures of the plurality of first antenna modules, identify candidate antenna modules in consideration of the plurality of first antenna modules, select a serving antenna module from among the candidate antenna modules to maintain an available temperature state in which temperatures of the candidate antenna modules are lower than a threshold temperature, and control the serving antenna module to transmit and receive a signal in the first frequency band, wherein the candidate antenna modules include antenna modules supporting communication performance higher than a threshold level.

According to an example embodiment, the at least one processor may be configured to include an antenna module of the plurality of antenna modules, having a temperature lower than the threshold temperature (th_TEMP_USAGE), in the candidate antenna modules.

According to an example embodiment, based on the candidate antenna modules not providing communication performance higher than or equal to the threshold level, the at least one processor may be configured to perform control the electronic device to receive a signal in the first frequency band through the serving antenna module and transmit a signal in a second frequency band through an antenna module using the second frequency band different from the first frequency band.

According to an example embodiment, in an uplink traffic-centric case in which a transmission operation is dominant over a reception operation, the at least one processor may be configured to transmit a signal in the second frequency band through an antenna module using the second frequency band different from the first frequency band.

According to an example embodiment, based on the candidate antenna modules not being identified from the plurality of antenna modules, the at least one processor may be configured to terminate the transmitting and receiving of the signal in the first frequency band and transmit and receive a signal in the second frequency band through the antenna module using the second frequency band.

According to an example embodiment, based on the candidate antenna modules not being identified from the plurality of antenna modules, the at least one processor may make a request for terminating transmission and reception of the signal in the first frequency band to a BS.

According to an example embodiment, the first frequency band may be 24.25 GHz to 52.6 GHz, and the second frequency band may be one of 410 MHz to 6 GHz or 410 MHz to 7.125 GHz, and the second frequency band may include an LTE frequency band allocated for a long-term evolution (LTE) network and an NR frequency band allocated for a new radio (NR) network.

According to an example embodiment, the antenna module supporting the communication performance higher than or equal to the threshold level may comprise an antenna module measuring a reference signal received power (RSRP) belonging to a specified power range among the plurality of antenna modules, and the specified power range may be configured based on an RSRP measured by the serving antenna module.

According to an example embodiment, the at least one processor may be configured to select, as a new serving antenna module, a candidate antenna module, having a temperature identified to be lower than a temperature of the serving antenna module by a threshold temperature value or higher, from the candidate antenna modules.

According to an example embodiment, the at least one processor may be configured to identify one or a plurality of antenna modules, having temperatures identified to be lower than a temperature of the serving antenna module by a threshold temperature value or higher, from among the candidate antenna modules and select, as a new antenna module, an antenna module measuring a signal quality better than a signal quality of the serving antenna module from among the one or plurality of identified antenna modules.

The scope of the disclosure is defined by detailed description, including the accompanying claims. Example implementations can be realized by including one or more characteristics commonly and individually taken from various embodiments and in the form of all permutations.

Examples described in the disclosure may include non-restrictive example implementations of components corresponding to one or more characteristics specified by the accompanying independent claims, and each or a combination of the characteristics (or components corresponding thereto) may contribute to improving of one or more technical problems which can be inferred by those skilled in the art from the disclosure.

Further, one or more selected components of one random example described in the disclosure may be combined with one or more selected components of one or more other examples described in the disclosure or may be alternatively combined with characteristics of the accompanying independent claims to form additionally alternative examples.

Additional example implementations may be realized by including one or more components commonly and individually taken from random implementation described in the disclosure (of any herein described implementation) randomly and in the form of all permutations. Other example implementations may also be realized by combining one or more characteristics of the accompanying claims with one or more selected components among random example implementations described in the disclosure.

When forming the additional example implementations, some components of any example implementation described in the disclosure may be omitted. One or more components which can be omitted are components which can be directly and clearly understood as not being necessary for the function of the technique on the basis of a discernible technical problem from the disclosure by those skilled in the art. Those skilled in the art would recognize that, even though the omitted components are replaced or removed, other components or characteristics of an additional alternative example do not need to be modified to compensate for the change. Accordingly, additional example implementations may be included in the disclosure although a selected combination of the characteristic and/or the components is not specifically mentioned according to the technique.

Two or more physically separate components of any example implementation described in the disclosure may be alternatively integrated into a single component if the integration is possible, and the integration is possible if the same function is performed by the configured single component. On the other hand, a single component of any example implementation described in the disclosure may be alternatively realized as two or more separate components achieving the same function where appropriate.

The methods according to embodiments described in the claims or the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although various example embodiments have been described in the detailed description of the disclosure, various modifications and changes may be made thereto without departing from the scope of the disclosure. Therefore, the scope of the disclosure is limited to the various example embodiments, and includes the appended claims and equivalents thereof. It will also be understood that any of the embodiment(s) described herein may be used in conjunction with any other embodiment(s) described herein.

What is claimed is:

1. A method performed by an electronic device, the method comprising:

monitoring temperatures of a plurality of antenna modules supporting a first frequency band;

in case that a temperature of a first antenna module performing a communication among the plurality of antenna modules exceeds a specific temperature during monitoring the temperatures, identifying at least one antenna module having a temperature equal to or less than the specific temperature among the plurality of antenna modules;

identifying whether a difference between a reference signal received power (RSRP) value of the first antenna module and an RSRP value of the at least one antenna module exceeds a threshold;

in case that the difference exceeds the threshold:

transmitting uplink signals using an antenna supporting a second frequency band lower than the first frequency band; and receiving downlink signals using the first antenna module supporting the first frequency band.

2. The method of claim 1, wherein, in case that an uplink traffic is larger than a downlink traffic, the uplink signals are transmitted through the antenna supporting the second frequency band.

3. The method of claim 1, further comprising:

in case that the at least one antenna module is not identified from the plurality of antenna modules:

terminating a communication using the plurality of antenna modules supporting the first frequency band, and transmitting and receiving a signal of the second frequency band using the antenna.

4. The method of claim 1, further comprising:

in case that the at least one antenna module is not identified from the plurality of antenna modules, transmitting, to a base station, a request message for terminating transmission and reception of a signal of the first frequency band.

5. The method of claim 4, wherein the request message includes first information indicating a bandwidth of the first frequency band and second information indicating a bandwidth of the second frequency band, wherein a communication of the first frequency band is terminated based on the first information, and wherein a communication of the second frequency band is performed based on the second information.

6. The method of claim 1, wherein the first frequency band is in a range of 24.25 GHz to 52.6 GHz, and the second frequency band is in a range of one of 410 MHz to 6 GHz or 410 MHz to 7.125 GHz, and wherein the second frequency band includes a long-term evolution (LTE) frequency band allocated for an LTE network and a new radio (NR) frequency band allocated for an NR network.

7. The method of claim 1, wherein the threshold is determined based on the RSRP value of the first antenna module and a data throughput.

8. The method of claim 1, further comprising:

identifying that each of a second antenna module and a third antenna module has a temperature equal to or less than the specific temperature;

in case that the electronic device supports a transmission of the uplink signals and a reception of the downlink signals by using different antenna modules:

transmitting the uplink signals by using the second antenna module, and receiving the downlink signals by using the third antenna module.

9. The method of claim 8, further comprising:

in case that the electronic device does not support the transmission of the uplink signals and the reception of the downlink signals by using different antenna modules:

transmitting the uplink signals and receiving the downlink signals by using the second antenna module or the third antenna module.

10. An electronic device comprising:

a plurality of antenna modules supporting a first frequency band;

an antenna supporting a second frequency band lower than the first frequency band;

at least one processor comprising processor circuitry; and memory storing instructions that, when executed by the at least one processor individually or collectively, cause the electronic device to:

monitor temperatures of the plurality of antenna modules;

in case that a temperature of a first antenna module performing a communication among the plurality of antenna modules exceeds a specific temperature during monitoring the temperatures, identify at least one antenna module having a temperature equal to or less than the specific temperature among the plurality of antenna modules;

identify whether a difference between a reference signal received power (RSRP) value of the first antenna module and an RSRP value of the at least one antenna module exceeds a threshold;

in case that the difference exceeds the threshold:

transmit uplink signals using the antenna supporting the second frequency band lower than the first frequency band; and receive downlink signals using the first antenna module supporting the first frequency band.

11. The electronic device of claim 10, wherein, in case that an uplink traffic is larger than a downlink traffic, the uplink signals are transmitted through the antenna supporting the second frequency band.

12. The electronic device of claim 10, wherein the instructions cause the electronic device to:

in case that the at least one antenna module is not identified from the plurality of antenna modules:

terminate a communication using the plurality of antenna modules supporting the first frequency band, and transmit and receive a signal in the second frequency band using the antenna.

13. The electronic device of claim 10, wherein the instructions cause the electronic device to:

in case that the at least one antenna module is not identified from the plurality of antenna modules, transmit, to a base station, a request message for terminating transmitting and receiving a signal of the first frequency band.

14. The electronic device of claim 13, wherein the request message includes first information indicating a bandwidth of the first frequency band and second information indicating a bandwidth of the second frequency band, wherein a communication of the first frequency band is terminated based on the first information, and wherein a communication of the second frequency band is performed based on the second information.

15. The electronic device of claim 10, wherein the first frequency band includes 24.25 GHz to 52.6 GHz, and the second frequency band includes at least one of 410 MHz to 6 GHz or 410 MHz to 7.125 GHZ, and wherein the second frequency band includes a long-term evolution (LTE) frequency band allocated for an LTE network and a new radio (NR) frequency band allocated for an NR network.

16. The electronic device of claim 10, wherein the threshold is determined based on the RSRP value of the first antenna module and a data throughput.

17. The electronic device of claim 10, wherein the instructions cause the electronic device to:

identify that each of a second antenna module and a third antenna module has a temperature equal to or less than the specific temperature;

in case that the electronic device supports a transmission of the uplink signals and a reception of the downlink signals by using different antenna modules:

transmit the uplink signals by using the second antenna module, and receive the downlink signals by using the third antenna module.

18. The electronic device of claim 17, wherein the instructions cause the electronic device to:

in case that the electronic device does not support the transmission of the uplink signals and the reception of the downlink signals by using different antenna modules:

transmit the uplink signals and receive the downlink signals by using the second antenna module or the third antenna module.

\* \* \* \* \*